United States Patent
Li

(10) Patent No.: US 11,284,369 B2
(45) Date of Patent: Mar. 22, 2022

(54) WIRELESS COMMUNICATIONS APPARATUS AND WIRELESS COMMUNICATION METHOD

(71) Applicant: HUAWEI TECHNOLOGIES CO., LTD., Guangdong (CN)

(72) Inventor: Jifeng Li, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/081,041

(22) Filed: Oct. 27, 2020

(65) Prior Publication Data

US 2021/0068069 A1 Mar. 4, 2021

Related U.S. Application Data

(63) Continuation of application No. PCT/CN2018/125712, filed on Dec. 29, 2018.

(30) Foreign Application Priority Data

Apr. 28, 2018 (CN) .......................... 201810402943.5

(51) Int. Cl.
*H04W 60/04* (2009.01)
*H04W 8/24* (2009.01)
(Continued)

(52) U.S. Cl.
CPC ............. *H04W 60/04* (2013.01); *H04W 8/24* (2013.01); *H04W 48/20* (2013.01); *H04W 64/00* (2013.01)

(58) Field of Classification Search
CPC .............................. H04W 24/10; H04W 48/18
(Continued)

(56) References Cited

U.S. PATENT DOCUMENTS

2012/0315890 A1* 12/2012 Suzuki ................ H04W 24/10
455/422.1
2014/0169216 A1 6/2014 Mansson et al.
(Continued)

FOREIGN PATENT DOCUMENTS

CN 102075630 A 5/2011
CN 104025630 A 9/2014
(Continued)

OTHER PUBLICATIONS

3GPP TS 36.304 V14.6.0 (Mar. 2018),3rd Generation Partnership Project;Technical Specification Group Radio Access Network,Evolved Universal Terrestrial Radio Access (E-UTRA); User Equipment (UE) procedures in idle mode (Release 14), total 50 pages.
(Continued)

*Primary Examiner* — Kiet M Doan
(74) *Attorney, Agent, or Firm* — Womble Bond Dickinson (US) LLP

(57) ABSTRACT

A wireless communications apparatus and a wireless communication method are provided. The method includes: deactivating a first wireless communication capability of a first communications module, so that the first communications module does not support the first wireless communication capability; activating a first wireless communication capability of a second communications module, so that the second communications module supports the first wireless communication capability; sending a first uplink message, where the first uplink message is used to indicate that a first user identity does not support the first wireless communication capability; and sending a second uplink message, where the second uplink message is used to indicate that a second user identity supports the first wireless communication capability. In embodiments of this application, the wireless communications apparatus can provide a better service during communication by using the second user
(Continued)

identity, without changing a correspondence between the user identity and the communications module.

18 Claims, 14 Drawing Sheets

(51) Int. Cl.
 *H04W 48/20* (2009.01)
 *H04W 64/00* (2009.01)

(58) Field of Classification Search
 USPC .................................. 455/450, 418; 371/312
 See application file for complete search history.

(56) References Cited

U.S. PATENT DOCUMENTS

2015/0019857 A1* 1/2015 Adams ................ G06F 9/44505
 713/100

2015/0023258 A1   1/2015 Hu et al.
2015/0296364 A1  10/2015 Peruru et al.

FOREIGN PATENT DOCUMENTS

| CN | 105101164 A | 11/2015 |
| CN | 105472695 A | 4/2016 |
| CN | 106465134 A | 2/2017 |
| CN | 107509240 A | 12/2017 |
| EP | 3149988 A1 | 4/2017 |
| GB | 2492577 A | 1/2013 |
| WO | 2015180779 A1 | 12/2015 |

OTHER PUBLICATIONS

3GPP TS 38.304 v1.0.1 (Apr. 2018),3rd Generation Partnership Project; Technical Specification Group Radio Access Metwork;NR;User Equipment (UE) procedures in Idle mode and RRC Inactive state(Release 15), total 21 pages.

* cited by examiner

WIRELESS COMMUNICATIONS APPARATUS AND WIRELESS COMMUNICATION METHOD

CROSS-REFERENCE TO RELATED APPLICATIONS

This application is a continuation of International Application No. PCT/CN2018/125712, filed on Dec. 29, 2018, which claims priority to Chinese Patent Application No. 201810402943.5, filed on Apr. 28, 2018. The disclosures of the aforementioned applications are hereby incorporated by reference in their entireties

TECHNICAL FIELD

The present application relates to the field of wireless communications technologies, and in particular, to a wireless communications apparatus and a wireless communication method.

BACKGROUND

In real life, more users have more than one mobile phone number. Terminal vendors have launched dual-card terminal devices to meet user needs, so that users can insert two subscriber identity modules (SIM) cards from the same operator or different operators into the same terminal, and two cards can be standby at the same time. During working with dual cards, a user can select one card as a data card on a screen, and the user's services such as web browsing are performed by using the card selected by the user. If data traffic of this card is used up, the user needs to select the other card as the data card, so as to continue to use data services.

Each SIM card of a current terminal corresponds to one modem, and radio access technologies supported by the two modems are different. For example, the radio access technologies supported by modem 1 corresponding to SIM card 1 include global system for mobile communications (GSM), universal mobile telecommunications system (UMTS), long term evolution (LTE), and new radio (NR); radio access technologies supported by modem 2 corresponding to SIM card 2 include GSM, UMTS, and LTE (excluding NR). Due to limitations on their costs and areas, terminal products cannot support dual SIM dual active (DSDA) and can support only dual SIM dual standby (DSDS). Therefore, to allow users to still enjoy the best data service experience when the data card is switched to SIM card 2, SIM card 2 needs to be switched to modem 1 and SIM card 1 needs to be switched to modem 2 during data card switching.

However, because a correspondence between the SIM card and the modem needs to be switched in the foregoing switching manner, a switching process is relatively complex and a switching period lasts for a long time.

SUMMARY

Embodiments of this application provide a wireless communications apparatus and a wireless communication method, so as to resolve an existing technical problem that a switching process is relatively complex and a switching period lasts for a long time.

According to a first aspect, an embodiment of this application provides a wireless communications apparatus, where the wireless communications apparatus can perform wireless communication by using a first user identity and a second user identity; a first communications module corresponding to the first user identity supports a first wireless communication capability and a second wireless communication capability; a second communications module corresponding to the second user identity supports the second wireless communication capability; and the wireless communications apparatus includes the following:

an interface circuit, and one or more processors coupled to the interface circuit, where the wireless communications apparatus is configured to:

deactivate the first wireless communication capability of the first communications module, so that the first communications module does not support the first wireless communication capability;

activate a first wireless communication capability of the second communications module, so that the second communications module supports the first wireless communication capability;

send a first uplink message through the interface circuit, where the first uplink message is used to indicate that the first user identity does not support the first wireless communication capability; and send a second uplink message through the interface circuit, where the second uplink message is used to indicate that the second user identity supports the first wireless communication capability.

In an embodiment of this application, the wireless communications apparatus can change the wireless communication capabilities supported by the first communications module and the second communications module by deactivating the first wireless communication capability of the first communications module and activating the first wireless communication capability of the second communications module, so that the wireless communications apparatus can provide a better service during communication by using the second user identity, without changing a correspondence between the user identity and the communications module.

It should be understood that, in an embodiment of this application, the wireless communications apparatus may be a terminal device or a chip, and the chip may be disposed in the terminal device. When the wireless communications apparatus is a terminal device, the interface circuit may be understood as a functional circuit that includes components such as an antenna and a radio frequency transceiver. The functional circuit is used to directly send and receive a radio signal. When the wireless communications apparatus is a chip, the interface circuit may be understood as an input/output interface circuit of the chip. These input/output interfaces can be further connected to the components such as the radio frequency transceiver and the antenna to receive or send a message or information carried in the radio signal. One or more processors coupled to these interface circuits may be understood as one or more of processors with different functions, such as an application program processor (sometimes referred to as an application processor), a baseband processor (sometimes referred to as a modem), and a radio frequency processor. The baseband processor and the radio frequency processor are sometimes collectively referred to as a communications processor. Alternatively, the communications processor may only be either the baseband processor or the radio frequency processor. The communications module may be understood as the communications processor, or may be understood as a software program, code, or an instruction that implements all or some of functions of the communications processor.

In an embodiment, the first wireless communication capability belongs to a first radio access technology, the second wireless communication capability belongs to a second radio access technology, and the communication capability of the first radio access technology is superior to the communication capability of the second radio access technology.

In an embodiment, the first radio access technology is a 5G radio access technology, the second radio access technology is a 4G radio access technology, and at least one of the first uplink message and the second uplink message is a tracking area update TAU request message.

In an embodiment, the first radio access technology is a 4G radio access technology, the second radio access technology is a 3G or 2G radio access technology, and at least one of the first uplink message and the second uplink message is a location area update LAU request message.

It can be learned from the foregoing content that, because the foregoing method does not change the correspondence between the user identity and the communications module, the wireless communications apparatus does not need to perform de-registration and re-registration processes, but can use the TAU request message or the LAU request message to indicate a change of the wireless communication capability supported by the first communications module or the second communications module. An implementation is relatively simple.

In an embodiment, one or more processors of the wireless communications apparatus are configured to:

before sending the first uplink message, enable the wireless communications apparatus to perform a cell selection procedure or a cell reselection procedure by using the first user identity, so that the wireless communications apparatus is to select a cell of the second radio access technology from a cell of the first radio access technology by using the first user identity.

In this way, the wireless communications apparatus can perform the cell selection procedure or the cell reselection procedure by using the first user identity, without a need to perform de-registration and re-registration, thereby effectively avoiding voice service interruption.

In an embodiment, one or more processors of the wireless communications apparatus are configured to:

after sending the second uplink message, enable the wireless communications apparatus to perform a cell selection procedure, a cell reselection procedure, or a background scanning procedure by using the second user identity, so that the wireless communications apparatus is to select a cell of the first radio access technology from a cell of the second radio access technology by using the second user identity.

In this way, the wireless communications apparatus can perform the cell selection procedure, the cell reselection procedure, or the background scanning procedure by using the second user identity, without a need to perform de-registration and re-registration, thereby effectively avoiding voice service interruption, and helping reduce duration of data service interruption.

In an embodiment, the first wireless communication capability and the second wireless communication capability belong to a same radio access technology, and the first wireless communication capability is superior to the second wireless communication capability.

In an embodiment, the radio access technology is a 4G or 5G radio access technology, and a quantity of multiple carriers used by the first wireless communication capability is larger than a quantity of multiple carriers used by the second wireless communication capability.

In an embodiment, one or more processors of the wireless communications apparatus are configured to:

determine, based on instruction input in a user interface, that a user identity corresponding to default mobile data needs to be changed from the first user identity to the second user identity.

In an embodiment, one or more processors of the wireless communications apparatus are configured to:

determine, based on usage of data traffic, that a user identity corresponding to default mobile data is changed from the first user identity to the second user identity.

According to a second aspect, an embodiment of this application provides a wireless communication method, where the method is applied to a wireless communications apparatus; the wireless communications apparatus can perform wireless communication by using a first user identity and a second user identity; a first communications module corresponding to the first user identity supports a first wireless communication capability and a second wireless communication capability; a second communications module corresponding to the second user identity supports the second wireless communication capability; and the method includes the following:

deactivating the first wireless communication capability of the first communications module, so that the first communications module does not support the first wireless communication capability;

activating a first wireless communication capability of the second communications module, so that the second communications module supports the first wireless communication capability;

sending a first uplink message, where the first uplink message is used to indicate that the first user identity does not support the first wireless communication capability; and sending a second uplink message, where the second uplink message is used to indicate that the second user identity supports the first wireless communication capability.

In an embodiment, before the first uplink message is sent, a cell selection procedure or a cell reselection procedure is performed by using the first user identity, so that the wireless communications apparatus is to select a cell of the second radio access technology from a cell of the first radio access technology by using the first user identity.

In an embodiment, after the second uplink message is sent, a cell selection procedure, a cell reselection procedure, or a background scanning procedure is performed by using the second user identity, so that the wireless communications apparatus is to select a cell of the first radio access technology from a cell of the second radio access technology by using the second user identity.

In an embodiment, before the first wireless communication capability of the first communications module is deactivated, it is determined, based on instruction input in a user interface, that a user identity corresponding to default mobile data needs to be changed from the first user identity to the second user identity.

In an embodiment, before the first wireless communication capability of the first communications module is deactivated, it is determined, based on usage of data traffic, that a user identity corresponding to default mobile data needs to be changed from the first user identity to the second user identity.

According to a third aspect, an embodiment of this application provides a wireless communications apparatus, where the wireless communications apparatus can perform wireless communication by using a first user identity and a second user identity; a first communications module corresponding to the first user identity supports a first wireless communication capability and a second wireless communication capability; a second communications module corresponding to the second user identity supports the second wireless communication capability; and the wireless communications apparatus includes a processing unit and a transceiver unit, where the processing unit is configured to: deactivate the first wireless communication capability of the first communications module, so that the first communications module does not support the first wireless communication capability; and activate a first wireless communication capability of the second communications module, so that the second communications module supports the first wireless communication capability; and the transceiver unit is configured to: send a first uplink message, where the first uplink message is used to indicate that the first user identity does not support the first wireless communication capability; and send a second uplink message, where the second uplink message is used to indicate that the second user identity supports the first wireless communication capability.

In an embodiment, before the transceiver unit sends the first uplink message, the processing unit is further configured to perform a cell selection procedure or a cell reselection procedure by using the first user identity, so that the wireless communications apparatus is to select a cell of the second radio access technology from a cell of the first radio access technology by using the first user identity.

In an embodiment, after the transceiver unit sends the second uplink message, the processing unit is further configured to perform a cell selection procedure, a cell reselection procedure, or a background scanning procedure by using the second user identity, so that the wireless communications apparatus is to select a cell of the first radio access technology from a cell of the second radio access technology by using the second user identity.

In an embodiment, before deactivating the first wireless communication capability of the first communications module, the processing unit is further configured to determine, based on instruction input in a user interface, that a user identity corresponding to default mobile data needs to be changed from the first user identity to the second user identity.

In an embodiment, before deactivating the first wireless communication capability of the first communications module, the processing unit is further configured to determine, based on usage of data traffic, that a user identity corresponding to default mobile data needs to be changed from the first user identity to the second user identity.

Based on the wireless communication method according to the second aspect or the wireless communications apparatus according to the third aspect, in a possible design, the first wireless communication capability belongs to a first radio access technology, the second wireless communication capability belongs to a second radio access technology, and the communication capability of the first radio access technology is superior to the communication capability of the second radio access technology.

In an embodiment, the first radio access technology is a 5G radio access technology, the second radio access technology is a 4G radio access technology, and at least one of the first uplink message and the second uplink message is a tracking area update TAU request message.

In an embodiment, the first radio access technology is a 4G radio access technology, the second radio access technology is a 3G or 2G radio access technology, and at least one of the first uplink message and the second uplink message is a location area update LAU request message.

Based on the wireless communication method according to the second aspect or the wireless communications apparatus according to the third aspect, in a possible design, the first wireless communication capability and the second wireless communication capability belong to a same radio access technology, and the first wireless communication capability is superior to the second wireless communication capability.

In an embodiment, the radio access technology is a 4G or 5G radio access technology, and a quantity of multiple carriers used by the first wireless communication capability is larger than a quantity of multiple carriers used by the second wireless communication capability.

According to a fourth aspect, an embodiment of this application provides a wireless communications apparatus, including the following:

an interface circuit, and one or more processors coupled to the interface circuit, where the wireless communications apparatus is configured to:

enable the wireless communications apparatus to camp on a cell of a first radio access technology by using a first user identity, and to camp on a cell of a second radio access technology by using a second user identity;

determine that a user identity corresponding to default mobile data needs to be changed from the first user identity to the second user identity;

enable the wireless communications apparatus to perform a cell selection procedure or a cell reselection procedure, so that the wireless communications apparatus camps on the cell of the second radio access technology by using the first user identity; and send a first uplink message through the interface circuit, where the first uplink message is used to indicate that the first user identity does not support the first radio access technology.

In this way, in this embodiment of this application, after it is determined that the user identity corresponding to the default mobile data needs to be changed from the first user identity to the second user identity, the cell procedure or the cell reselection procedure can be performed, so that the wireless communications apparatus camps on the cell of the second radio access technology by using the first user identity, without a need to perform the de-registration and re-registration processes by using the first user identity, thereby ensuring that a voice service is not interrupted.

In an embodiment, one or more processors of the wireless communications apparatus are configured to:

send a second uplink message through the interface circuit, where the second uplink message is used to indicate that the second user identity supports the first radio access technology.

In an embodiment, one or more processors of the wireless communications apparatus are configured to:

enable the wireless communications apparatus to perform a cell selection procedure, a cell reselection procedure, or a background scanning procedure, so that the wireless communications apparatus camps on the cell of the first radio access technology by using the second user identity.

According to a fifth aspect, an embodiment of this application provides a wireless communication method, including the following:

camping on a cell of a first radio access technology by using a first user identity, and camping on a cell of a second radio access technology by using a second user identity;

determining that a user identity corresponding to default mobile data needs to be changed from the first user identity to the second user identity;

performing a cell selection procedure or a cell reselection procedure, so that the wireless communications apparatus camps on the cell of the second radio access technology by using the first user identity; and sending a first uplink message, where the first uplink message is used to indicate that the first user identity does not support the first radio access technology.

In a possible design, the method further includes the following:

sending a second uplink message, where the second uplink message is used to indicate that the second user identity supports the first radio access technology.

In an embodiment, after sending the second uplink message, the method further includes the following:

performing a cell selection procedure, a cell reselection procedure, or a background scanning procedure, so that the wireless communications apparatus camps on the cell of the first radio access technology by using the second user identity.

According to a sixth aspect, an embodiment of this application provides a wireless communications apparatus, including the following:

an interface circuit, and one or more processors coupled to the interface circuit, where the wireless communications apparatus is configured to:

enable the wireless communications apparatus to camp on a cell of a first radio access technology by using a first user identity, and to camp on a cell of a second radio access technology by using a second user identity;

determine that a user identity corresponding to default mobile data needs to be changed from the first user identity to the second user identity;

enable the wireless communications apparatus to perform cell selection or cell reselection, so that the wireless communications apparatus camps on the cell of the second radio access technology by using the first user identity; and send a second uplink message through the interface circuit, where the second uplink message is used to indicate that the second user identity supports the first radio access technology.

In this way, in this embodiment of this application, after it is determined that the user identity corresponding to the default mobile data needs to be changed from the first user identity to the second user identity, the cell process or the cell reselection procedure can be performed, so that the wireless communications apparatus camps on the cell of the second radio access technology by using the first user identity, without a need to perform the de-registration and re-registration processes by using the first user identity, thereby ensuring that a voice service is not interrupted. In addition, because the wireless communications apparatus no longer uses the first user identity to camp on the cell of the first radio access technology in this case, that is, no longer uses the first radio access technology, after sending the second uplink message, the wireless communications apparatus can subsequently use the first radio access technology by using the second user identity, so as to provide a better service.

In an embodiment, one or more processors of the wireless communications apparatus are configured to:

enable the wireless communications apparatus to perform a cell selection procedure, a cell reselection procedure, or a background scanning procedure, so that the wireless communications apparatus camps on the cell of the first radio access technology by using the second user identity.

In an embodiment, one or more processors of the wireless communications apparatus are configured to:

send a first uplink message through the interface circuit, where the first uplink message is used to indicate that the first user identity does not support the first radio access technology.

According to a seventh aspect, an embodiment of this application provides a wireless communication method, including the following:

camping on a cell of a first radio access technology by using a first user identity, and camping on a cell of a second radio access technology by using a second user identity;

determining that a user identity corresponding to default mobile data needs to be changed from the first user identity to the second user identity;

performing cell selection or cell reselection, so that the wireless communications apparatus camps on the cell of the second radio access technology by using the first user identity; and sending a second uplink message, where the second uplink message is used to indicate that the second user identity supports the first radio access technology.

In an embodiment, after sending the second uplink message, the method further includes the following:

performing a cell selection procedure, a cell reselection procedure, or a background scanning procedure, so that the wireless communications apparatus camps on the cell of the first radio access technology by using the second user identity.

In an embodiment, the method further includes the following:

sending a first uplink message, where the first uplink message is used to indicate that the first user identity does not support the first radio access technology.

Based on any aspect or any design of the foregoing fourth to seventh aspects, in a possible design, the first radio access technology is a 5G radio access technology, the second radio access technology is a 4G radio access technology, and the first uplink message or the second uplink message is a tracking area update TAU request message.

Based on any aspect or any design of the foregoing fourth to seventh aspects, in a possible design, the first radio access technology is a 4G radio access technology, the second radio access technology is a 3G or 2G radio access technology, and the first uplink message or the second uplink message is a location area update LAU request message.

According to an eighth aspect, an embodiment of this application provides a wireless communications apparatus, where the wireless communications apparatus can perform wireless communication by using a first user identity and a second user identity; a first communications module corresponding to the first user identity supports a first wireless communication capability and a second wireless communication capability; a second communications module corresponding to the second user identity supports the second wireless communication capability; and the wireless communications apparatus includes the following:

an interface circuit, and one or more processors coupled to the interface circuit, where the wireless communications apparatus is configured to:

change a user identity corresponding to default mobile data from the first user identity to the second user identity;

send a first uplink request message through the interface circuit, where the first uplink request message is used to indicate that the first user identity does not support the first wireless communication capability; and send a second uplink request message through the interface circuit, where the second uplink message is used to indicate that the second user identity supports the first wireless communication capability, where the first uplink request message is a first tracking area update TAU request message; or, the second uplink request message is a second TAU request message; or, the first uplink request message is a first location area update LAU request message; or, the second uplink request message is a second location area update LAU request message.

In this way, after changing the user identity corresponding to the default mobile data from the first user identity to the second user identity, the wireless communications apparatus can report a change status of the wireless communication capability of the first user identity or the second user identity by using the TAU request message or the LAU request message. In comparison with the prior art in which the change statuses of the wireless communication capabilities of the first user identity and the second user identity need to be reported in the de-registration and re-registration processes, the implementation is simpler, and can effectively reduce duration of service interruption.

In an embodiment, that one or more processors of the wireless communications apparatus are configured to: change a user identity corresponding to default mobile data from the first user identity to the second user identity includes:

One or more processors of the wireless communications apparatus are configured to:

deactivate the first wireless communication capability of the first communications module, so that the first communications module does not support the first wireless communication capability; and activate a first wireless communication capability of the second communications module, so that the second communications module supports the first wireless communication capability.

According to a ninth aspect, an embodiment of this application provides a wireless communication method, including the following:

changing a user identity corresponding to default mobile data from the first user identity to the second user identity;

sending a first uplink request message, where the first uplink request message is used to indicate that the first user identity does not support the first wireless communication capability; and sending a second uplink request message, where the second uplink message is used to indicate that the second user identity supports the first wireless communication capability, where the first uplink request message is a first tracking area update TAU request message; or, the second uplink request message is a second TAU request message; or, the first uplink request message is a first location area update LAU request message; or, the second uplink request message is a second location area update LAU request message.

In an embodiment, the changing a user identity corresponding to default mobile data from the first user identity to the second user identity includes the following:

deactivating a first wireless communication capability of the first communications module, so that the first communications module does not support the first wireless communication capability; and activating a first wireless communication capability of the second communications module, so that the second communications module supports the first wireless communication capability.

Based on any design in the eighth aspect or the ninth aspect, in a possible design, the first wireless communication capability belongs to a first radio access technology, the second wireless communication capability belongs to a second radio access technology, and the communication capability of the first radio access technology is superior to the communication capability of the second radio access technology.

Based on any design in the eighth aspect or the ninth aspect, in a possible design, the first wireless communication capability and the second wireless communication capability belong to a same radio access technology, and the first wireless communication capability is superior to the second wireless communication capability.

In the embodiments of this application, the wireless communications apparatuses or the wireless communication methods according to the first aspect to the ninth aspect are technical solutions obtained based on the same inventive concept. Adaptive reference can be made between these aspects, and the technical solution according to any one of the first aspect to the ninth aspect can be used independently, or a possible design of a specific aspect can be combined with another aspect to form a new solution. For example, the possible designs of the first to the third aspects can be combined with the fourth to the ninth aspects respectively, and combinations are not listed one by one herein.

Another aspect of the embodiments of this application provides a wireless communications apparatus, including at least one processor, where the at least one processor is coupled to at least one memory;

the at least one processor is configured to execute a computer program or instruction stored in the at least one memory, so that the wireless communications apparatus performs the method according to any design in the second aspect, the fifth aspect, the seventh aspect, or the ninth aspect.

Still another aspect of the embodiments of this application provides a readable storage medium, where the readable storage medium includes a program or an instruction, and when the program or the instruction is executed, the method according to any design in the second aspect, the fifth aspect, the seventh aspect, or the ninth aspect is performed.

Yet another aspect of the embodiments of this application provides a computer program product, where when program code included in the computer program product is executed by a wireless communications apparatus, the wireless communications apparatus is enabled to perform the method according to any design in the second aspect, the fifth aspect, the seventh aspect, or the ninth aspect.

DESCRIPTION OF EMBODIMENTS

The following describes the embodiments of this application in detail with reference to the accompanying drawings in this specification. A specific operation method in a method embodiment may also be applied to an apparatus embodiment or a system embodiment.

The embodiments of this application may be applied to various mobile communications systems, such as a new radio (NR) system, a global system for mobile communications (GSM), a code division multiple access (CDMA) system, a wideband code division multiple access (WCDMA) system, a general packet radio service (GPRS) system, a long term evolution (LTE) system, a long term evolution advanced (LTE-A) system, a universal mobile telecommunications system (UMTS), an evolved long term evolution (eLTE) system, a future communications system, and other communications systems. This is not specifically limited herein.

Figure 1:
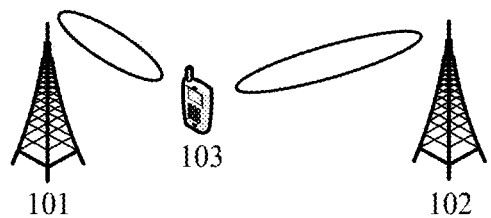
FIG. 1 is a schematic architectural diagram of a wireless communications network.

To facilitate understanding of the embodiments of this application, a communications system applicable to the embodiments of this application is first described in detail by using a communications system shown in FIG. 1 as an example. FIG. 1 is a schematic diagram of a communications system applicable to a communication method according to an embodiment of this application. As shown in FIG. 1, a first network includes a network device 101, and a second network includes a network device 102. A terminal device 103 can simultaneously attach two users to a cell in the network device 101 and a cell in the network device 102 respectively, and enable one user to maintain a wireless connection with the cell in the network device 101, and enable the other user to camp on the cell in the network device 102.

It should be noted that in the embodiments of this application, "user" is a logical concept, and "user" may correspond to a SIM card, subscriber information, a virtual SIM card, or a user identity (such as international mobile subscriber identity (IMSI)/temporary mobile subscriber identity (TMSI), and is not limited to a natural person user, a physical terminal (a mobile phone), or the like. From the perspective of a network side, different "users" logically correspond to different communications entities served by the network side. For example, a terminal with a dual registration function means two communications entities for the network side. For another example, when a "user" corresponds to a SIM card or subscriber information, the network side identifies two terminals with different SIM cards or different subscriber information as two different communications entities, and identifies one terminal device with multiple different SIM cards or multiple pieces of subscriber information as multiple different communications entities, even though in practice the terminal with multiple different SIM cards or multiple pieces of subscriber information is just one physical entity.

Figure 2A:
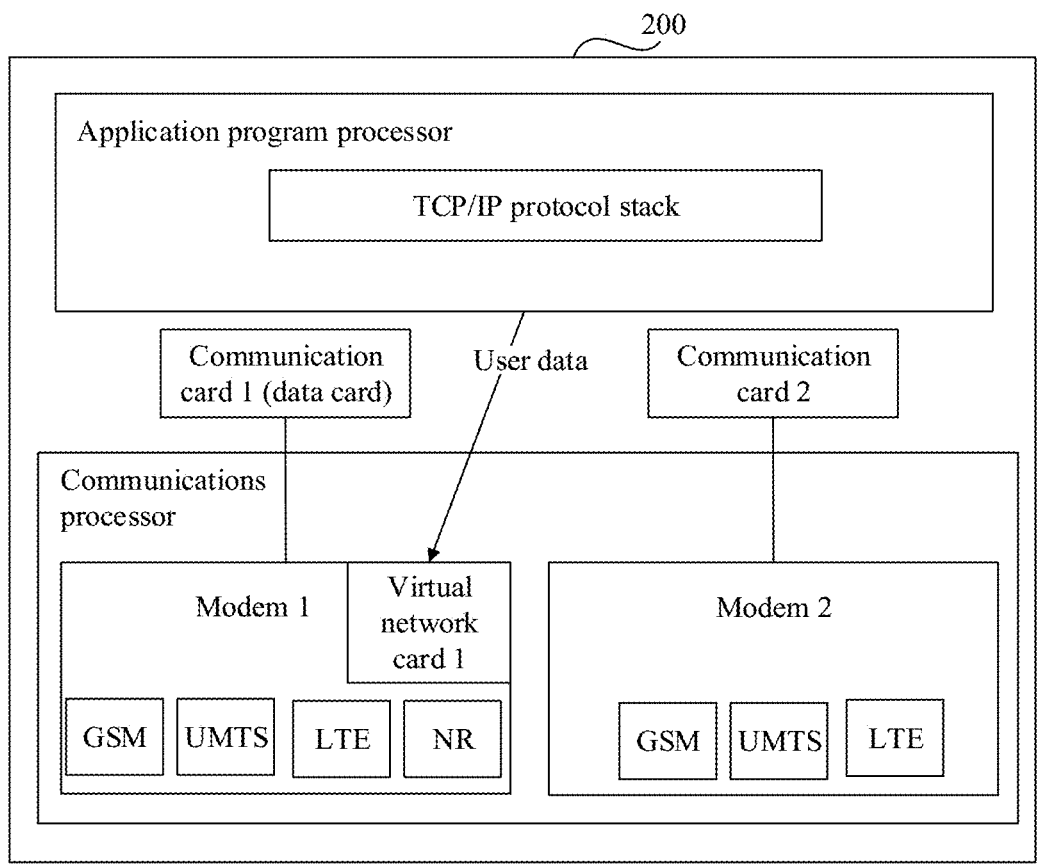
FIG. 2a is a schematic structural diagram of a terminal device applicable to an embodiment of this application.

FIG. 2a is a schematic structural diagram of a terminal device applicable to an embodiment of this application. As shown in FIG. 2a, the terminal device 200 includes an application program processor and a communications processor. A TCP/IP protocol stack runs on the application program processor to process a network connection requirement of an application program. The communications processor includes a modem 1 corresponding to a communication card 1 and a modem 2 corresponding to a communication card 2. Radio access technologies supported by the modem 1 include GSM, UMTS, LTE, and NR, and radio access technologies supported by the modem 2 include GSM, UMTS, and LTE.

Figure 2B:
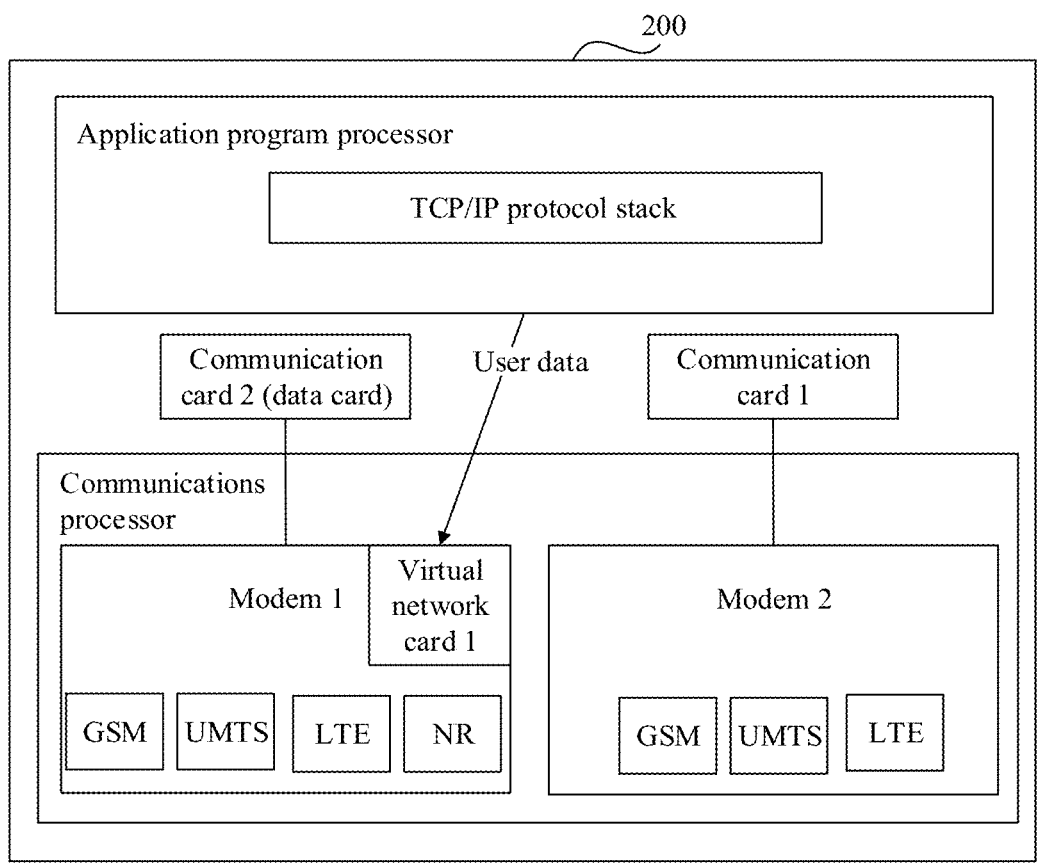
FIG. 2b is a schematic diagram after switching in the prior art.

Normally, the terminal device uses the communication card 1 as a data card by default (that is, a user identity corresponding to mobile data is the communication card 1). In this case, the TCP/IP protocol stack sends user data to the modem 1 in the communications processor through the virtual network card 1, and then communicates with the network device through the modem 1. When the terminal device switches to use the communication card 2 as the data card (that is, the user identity corresponding to the mobile data is the communication card 2), if the terminal device communicates with the network device through the modem 2, user experience may be poor because the radio access technologies supported by the modem 2 corresponding to the communication card 2 are less than the radio access technologies supported by the modem 1 corresponding to the communication card 1. To resolve this problem, an implementation in the prior art is to perform a switching process to switch the communication card 2 to the modem 1, and switch the communication card 1 to the modem 2, as shown in FIG. 2b, so that when the communication card 2 serves as the data card, the terminal device still communicates with the network device through the modem 1.

Figure 3A:
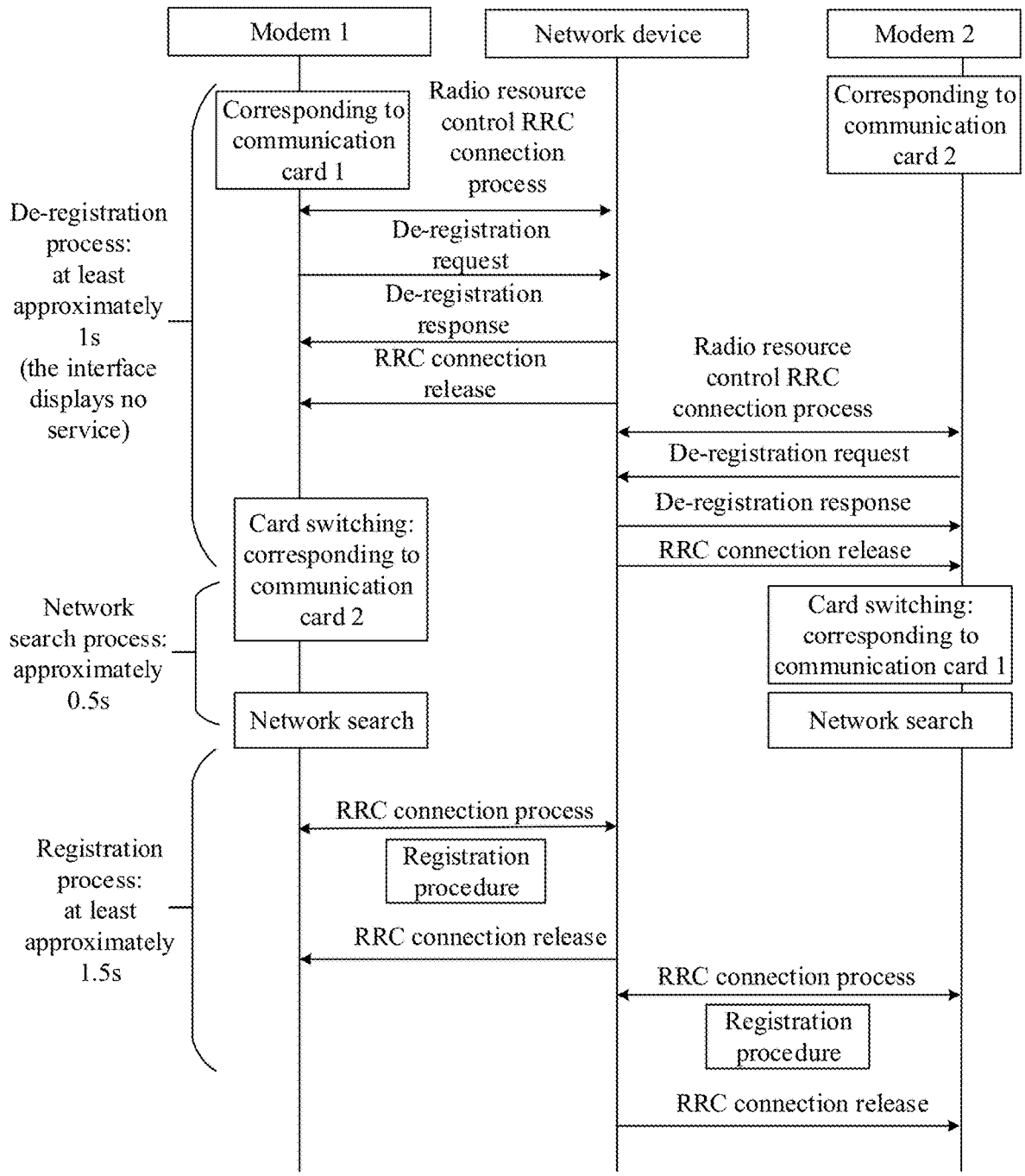
FIG. 3a is a schematic diagram of a communication card switching process in the prior art.

FIG. 3a is a schematic diagram of a communication card switching process in the prior art. As shown in FIG. 3a, the following three processes need to be performed:

(1) De-Registration Process

The modem 1 corresponding to the communication card 1 and the modem 2 corresponding to the communication card 2 are de-registered. Because concurrent execution of the de-registration process cannot be supported, the de-registration process of dual cards can only be completed sequentially. In FIG. 3, it is assumed that the modem 1 is de-registered first, and the modem 2 then initiates de-registration. The de-registration process lasts at least approximately 500 ms each time, and therefore the de-registration process of dual cards lasts at least 1 s. After that, the dual cards cannot provide the user with voice and data services, that is, both voice and data services are interrupted, and a network signal display area in a user interface shows no signal.

(2) Network Search Process

The communication card 1 corresponding to the modem 1 and the communication card 2 corresponding to the modem 2 are switched. After switching, the modem 1 corresponds to the communication card 2, and the modem 2 corresponds to the communication card 1. After that, the modem 1 corresponding to the communication card 2 initiates a network search process for the communication card 2, and the modem 2 corresponding to the communication card 1 initiates a network search process for the communication card 1. After the network search is successful, the registration process is started.

(3) Registration Process

The modem 1 corresponding to the communication card 2 interacts with the network of the communication card 2 to initiate the registration process, and then the modem 2 corresponding to the communication card 1 interacts with the network of the communication card 1 to initiate the registration process. After the registration is successful, the dual cards can provide services for the user, and the communication card 2 can provide a data service for the user through the modem 1. In this case, the network signal display area in the user interface starts to display a signal, and normal voice and data services are restored.

It can be learned from the foregoing content that, in the prior art, because a correspondence between a SIM card and a modem needs to be switched, a switching process is relatively complex, and a switching period lasts for a long time, which is approximately 3 s-8 s, that is, a service interruption time is relatively long, leading to poor user experience.

Based on this, embodiments of this application provide a wireless communications apparatus and a wireless communication method, so as to resolve an existing technical problem that a switching process is relatively complex and a switching period lasts for a long time.

In the embodiments of this application, the wireless communications apparatus may be a terminal device or a chip. When the wireless communications apparatus is a chip, the wireless communications apparatus may be a system-on-a-chip (SoC) main chip or a baseband modem chip. The chip can be applied to the terminal device. The terminal device may also be referred to as user equipment (UE), an access terminal, a subscriber unit, a subscriber station, a mobile station, a mobile console, a remote station, a remote terminal, a mobile device, a user terminal, a terminal, a wireless communications apparatus, a user agent, a user apparatus, or the like.

Figure 3B:
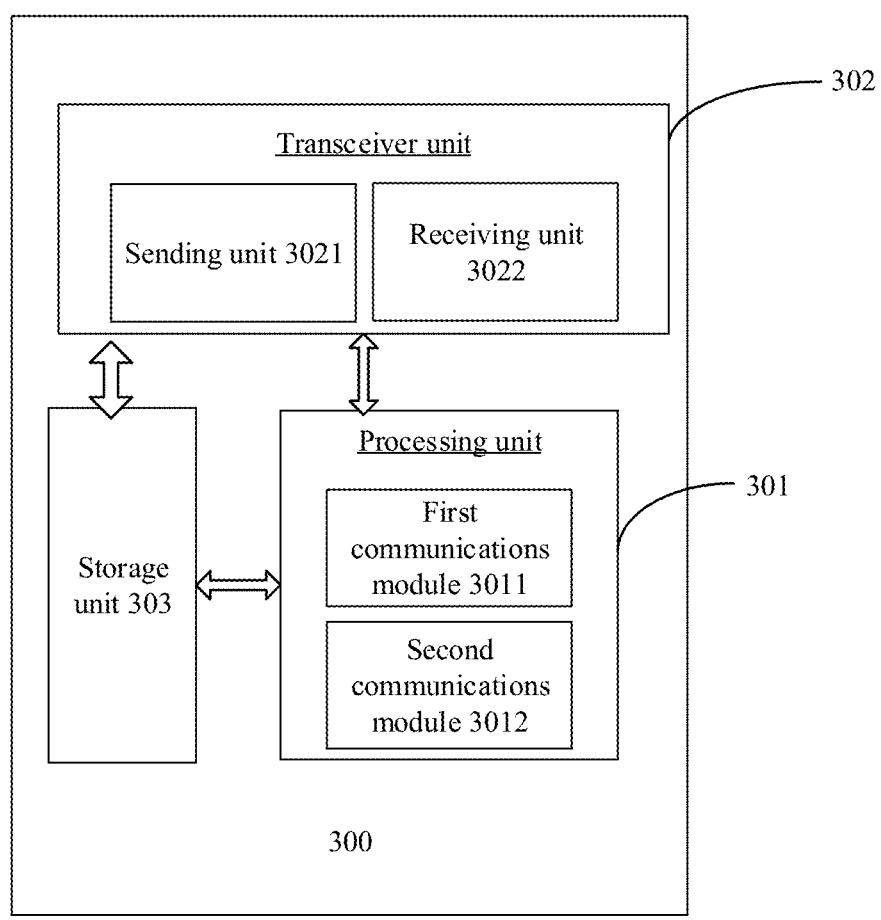
FIG. 3b is a schematic structural diagram of a wireless communications apparatus according to an embodiment of this application.

FIG. 3b is a schematic structural diagram of a wireless communications apparatus according to an embodiment of this application. As shown in FIG. 3b, a wireless communications apparatus 300 includes a processing unit 301, a transceiver unit 302, a storage unit 303, and the like. The processing unit 301 is mainly configured to control the entire wireless communications apparatus 300, execute a software program, and process data of the software program. The wireless communications apparatus 300 can perform wireless communication by using a first user identity and a second user identity. Correspondingly, the processing unit 301 may include a first communications module 3011 corresponding to the first user identity and a second communications module 3012 corresponding to the second user identity. In an embodiment, the first communications module 3011 can obtain the identity information of the first user, establish protocol stack information associated with the first user, and so on. The first communications module 3011 is configured to enable the first user to attach to a first network, that is, enable the terminal (or UE) to attach to the first network by using the first user identity. The second communications module 3012 can obtain the identity information of the second user, establish protocol stack information associated with the second user, and so on. The second communications module 3012 is configured to enable the terminal (or UE) to attach to a second network by using the second user identity.

A unit configured to implement a sending function in the transceiver unit 302 is regarded as a sending unit 3021, and a unit configured to implement a receiving function in the transceiver unit 302 is regarded as a receiving unit 3022. In other words, the transceiver unit 302 includes the sending unit 3021 and the receiving unit 3022. The receiving unit 3022 may also be referred to as a receiver, an input interface, a receiver circuit, or the like. The sending unit 3021 may be referred to as a transmitter, an emitter, an output interface, a transmitter circuit, or the like.

The foregoing various modules may be functional modules implemented by software code, functional modules implemented by hardware circuits, or functional modules implemented by a combination of software and hardware, which is not limited in this embodiment of this application.

In an embodiment of this application, the first communications module 3011 in the wireless communications apparatus 300 supports a first wireless communication capability and a second wireless communication capability, and the second communications module 3012 supports the second wireless communication capability. The wireless communications apparatus can perform a wireless communication method in Embodiment 1.

Embodiment 1

Figure 4:
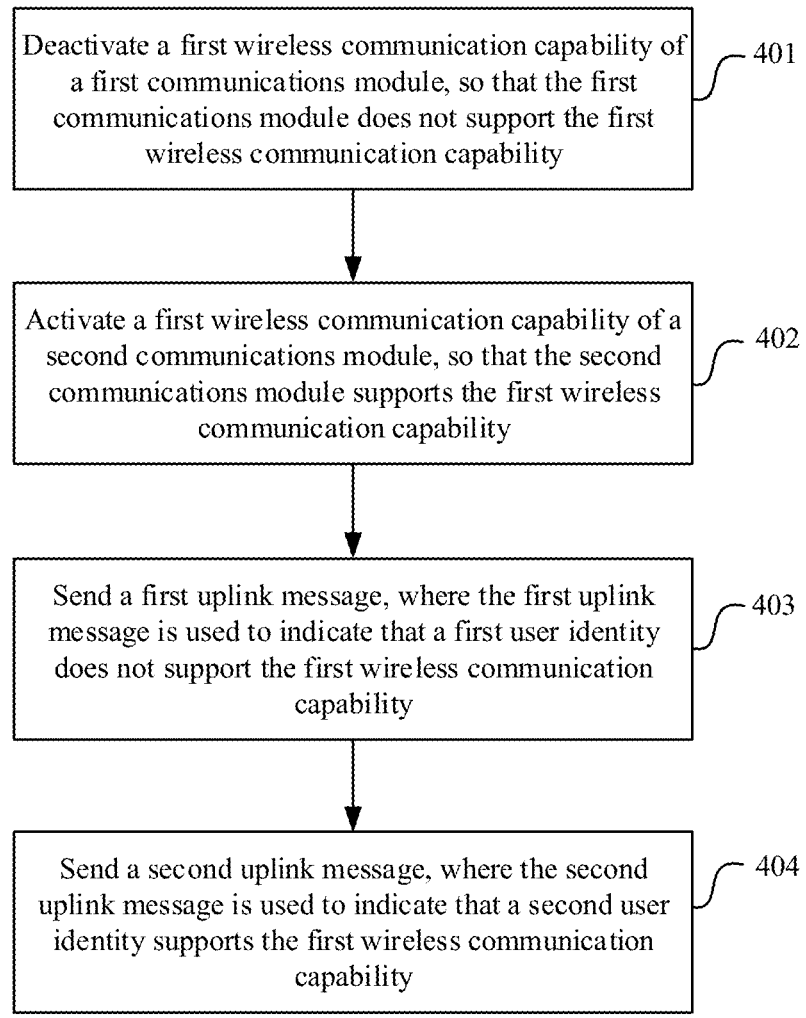
FIG. 4 is a schematic flowchart corresponding to a wireless communication method according to Embodiment 1 of this application.

FIG. 4 is a schematic flowchart corresponding to a wireless communication method according to Embodiment 1 of this application. As shown in FIG. 4, the method includes the following operations:

Operation 401: A wireless communications apparatus deactivates a first wireless communication capability of a first communications module, so that the first communications module does not support the first wireless communication capability.

Herein, before operation 401, in a possible case, the method may further include the following: the wireless communications apparatus may determine, based on instruction input in a user interface, that a user identity corresponding to default mobile data is changed from a first user identity to a second user identity. In this case, the switching of the user identity for data communication is manually triggered. In another example, the wireless communications apparatus may also determine, based on big data statistical analysis, artificial intelligence analysis, or a similar manner, to trigger the change of the user identity for wireless communication. For example, the wireless communications apparatus may determine, based on usage of data traffic, data traffic consumed by an activated application program, signal strength of the first communications module, signal strength of a second communications module, or the like, whether to trigger the change of the user identity for wireless communication. A specific implementation is not limited in this embodiment of this application, and may be set by a person skilled in the art based on an actual need.

In an embodiment of this application, before the wireless communications apparatus deactivates the first wireless communication capability of the first communications module, if the wireless communications apparatus performs data communication with a cell of a first radio access technology by using the first user identity (in a connected state), the wireless communications apparatus can first break a data connection and enter an idle state, and perform a cell selection procedure or a cell reselection procedure by using the first user identity, so that the wireless communications apparatus is to select a cell of a second radio access technology from the cell of the first radio access technology by using the first user identity; if the wireless communications apparatus camps on the cell of the first radio access technology by using the first user identity (in an idle state), the wireless communications apparatus can be directly to select the cell of the second radio access technology from the cell of the first radio access technology by using the first user identity; if the wireless communications apparatus performs data communication with the cell of the second radio access technology or camps on the cell of the second radio access technology by using the first user identity, the wireless communications apparatus can directly deactivate the first wireless communication capability of the first communications module.

For the cell selection procedure and the cell reselection procedure, refer to records in related technical specifications for 4G and 5G radio access technologies, such as records in section 5.2 of 3GPP TS 36.304 V14.6.0 and section 5.2 of 3GPP TS 38.304 v1.0.1. Details are not described herein.

Operation 402: The wireless communications apparatus activates a first wireless communication capability of the second communications module, so that the second communications module supports the first wireless communication capability.

In this way, the wireless communications apparatus can change the wireless communication capabilities supported by the first communications module and the second communications module by deactivating the first wireless communication capability of the first communications module and activating the first wireless communication capability of the second communications module, so that the wireless communications apparatus can provide a better service during communication by using the second user identity, without changing a correspondence between the user identity and the communications module.

In an embodiment of this application, the first wireless communication capability and the second wireless communication capability may belong to different radio access technologies; to be specific, the first wireless communication capability belongs to the first radio access technology, and the second wireless communication capability belongs to the second radio access technology, where the communication capability of the first radio access technology is superior to the communication capability of the second radio access technology. For example, the first radio access technology is a 5G radio access technology, and the second radio access technology is a 4G radio access technology. For another example, the first radio access technology is a 4G radio access technology, and the second radio access technology is a 3G or 2G radio access technology. The 5G radio access technology may be specifically an NR radio access technology. The 4G radio access technology may be specifically a radio access technology such as LTE, eLTE, or evolved universal terrestrial radio access E-UTRA). The 3G radio access technology may be specifically the universal terrestrial radio access (UTRA) radio access technology. The 2G radio access technology may be specifically a radio access technology such as GSM or CDMA.

The first wireless communication capability and the second wireless communication capability may also belong to a same radio access technology, and the first wireless communication capability is superior to the second wireless communication capability. The radio access technology may be a 4G or 5G radio access technology. In this case, there may be multiple possibilities for specific performance that the first wireless communication capability is superior to the second wireless communication capability, for example, a quantity of multiple carriers used by the first wireless communication capability is larger than a quantity of multiple carriers used by the second wireless communication capability. For example, both the first wireless communication capability and the second wireless communication capability belong to the 5G radio access technology, and both support four downlink carriers. Due to a limitation on the capability of the wireless communications apparatus, the first wireless communication capability and the second wireless communication capability cannot use the four downlink carriers at the same time. In this case, it is possible that the quantity of multiple carriers used by the first wireless communication capability is 3, and the quantity of multiple carriers used by the second wireless communication capability is 1. In other words, the quantity of multiple carriers used by the first wireless communication capability is larger than the quantity of multiple carriers used by the second wireless communication capability.

In an embodiment, the first wireless communication capability belongs to the NR radio access technology, and the second wireless communication capability belongs to the LTE radio access technology. Therefore, if the wireless communications apparatus determines that a user identity corresponding to default mobile data needs to be changed from the first user identity to the second user identity, to improve the user's data service experience, the wireless communications apparatus can deactivate the NR radio access technology of the first communications module, and activate the NR radio access technology of the second communications module. In this way, the wireless communications apparatus can subsequently communicate with a cell of the NR radio access technology by using the second user identity.

In another embodiment, both the first wireless communication capability and the second communication capability belong to the NR radio access technology, the quantity of multiple carriers used by the first wireless communication capability is 3, and the quantity of multiple carriers used by the second wireless communication capability is 1. Therefore, if the wireless communications apparatus determines that a user identity corresponding to default mobile data needs to be changed from the first user identity to the second user identity, to improve the user's data service experience, the wireless communications apparatus can deactivate the first wireless communication capability of the first communications module and activate the first wireless communication capability of the second communications module. In this way, the wireless communications apparatus can subsequently communicate with a cell of the NR radio access technology by using three carriers and the second user identity.

Operation 403: The wireless communications apparatus sends a first uplink message, where the first uplink message is used to indicate that the first user identity does not support the first wireless communication capability.

Operation 404: The wireless communications apparatus sends a second uplink message, where the second uplink message is used to indicate that the second user identity supports the first wireless communication capability.

Herein, if the first radio access technology is a 5G radio access technology and the second radio access technology is a 4G radio access technology, correspondingly, at least one of the first uplink message and the second uplink message is a tracking area update (TAU) request message. If the first radio access technology is a 4G radio access technology and the second radio access technology is a 3G or 2G radio access technology, correspondingly, at least one of the first uplink message and the second uplink message is a location area update (LAU) request message. In other words, because the foregoing method does not change the correspondence between the user identity and the communications module, the wireless communications apparatus does not need to perform de-registration and re-registration processes, but can use the TAU request message or the LAU request message to indicate a change of the wireless communication capability supported by the first communications module or the second communications module. An implementation is relatively simple, and helps reduce duration of service interruption.

Further, after operation 404, the method may further include the following: performing, by the wireless communications apparatus, a cell selection procedure, a cell reselection procedure, or a background scanning procedure by using the second user identity, so that the wireless communications apparatus is to select a cell of the first radio access technology from a cell of the second radio access technology by using the second user identity. In this way, when performing data communication by using the second user identity, the wireless communications apparatus can also use the first wireless communication capability, thereby providing a better service for a user.

The background scanning process may specifically mean that the wireless communications apparatus normally camps on a specific low-priority RAT or public land mobile network (PLMN), and periodically searches for a high-priority RAT and PLMN. The search manner is a network search technology that uses an idle time of current camping, without affecting a service of the current camping.

In an embodiment of this application, the first communications module 2011 may be a first modem in the wireless communications apparatus, and the second communications module 2012 may be a second modem in the wireless communications apparatus. Further, there may be multiple specific implementations in which the wireless communications apparatus deactivates the first wireless communication capability of the first communications module and activates the first wireless communication capability of the second communications module. The following provides description by using an example in which the first wireless communication capability belongs to the first radio access technology and the second wireless communication capability belongs to the second radio access technology.

Figure 5A:
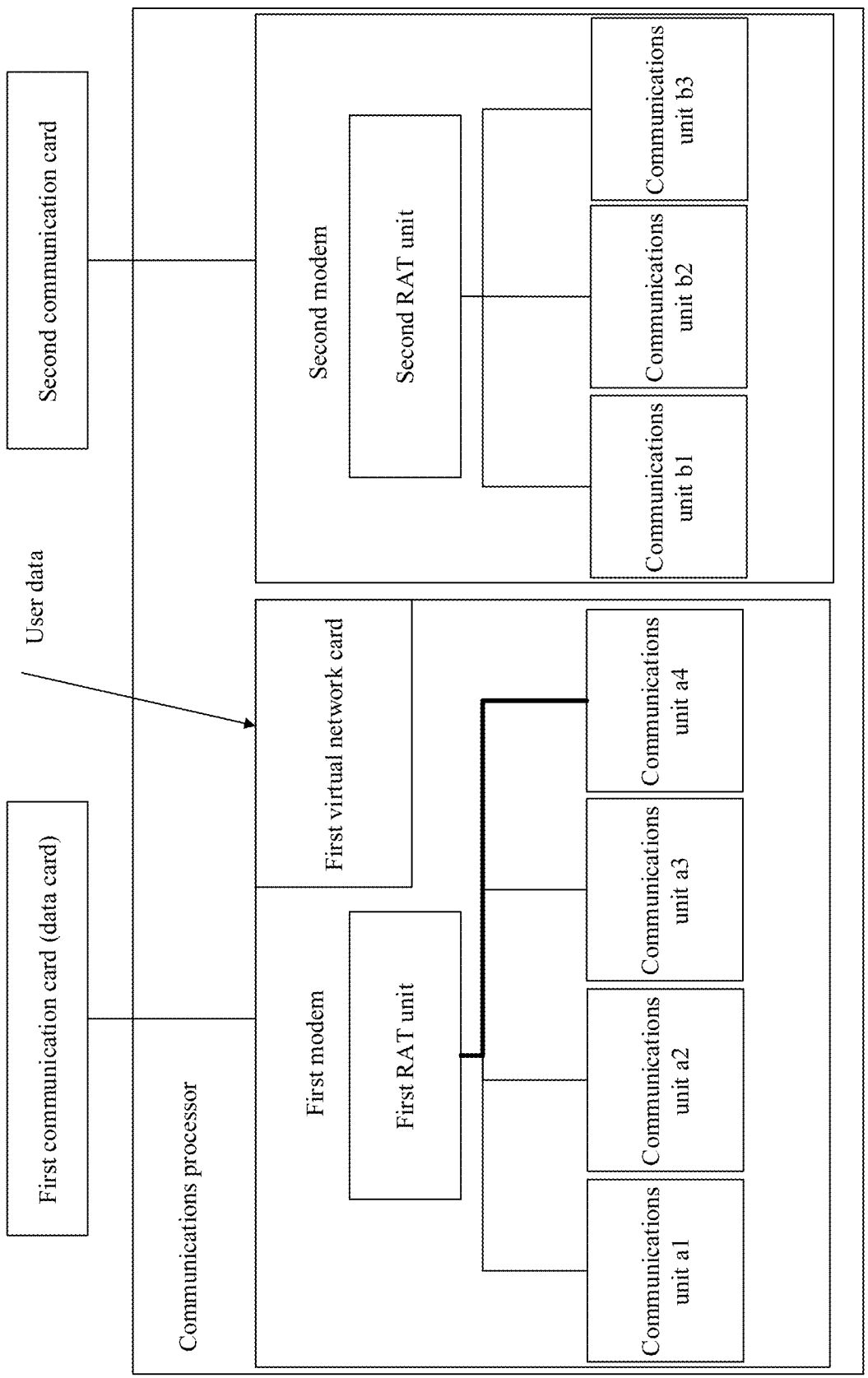
FIG. 5a is a schematic diagram before switching according to an embodiment of this application.

In an embodiment, as shown in FIG. 5a, the first modem includes a first RAT main control unit, and the first RAT main control unit is mounted to a communications unit (such as a communications unit a1, a communications unit a2, a communications unit a3, and a communications unit a4) corresponding to the wireless communication capability supported by the first modem. The communications unit may include a non-access stratum management unit, an access stratum management unit, and a baseband processing unit. The second modem includes a second RAT main control unit, and the second RAT main control unit is mounted to a communications unit (such as a communications unit b1, a communications unit b2, and a communications unit b3) corresponding to the radio access technology supported by the second modem. In an example, the communications unit a1, the communications unit a2, the communications unit a3, and the communications unit a4 may respectively correspond to different radio access technologies. For example, the radio access technology corresponding to the communications unit a1 is GSM, the radio access technology corresponding to the communications unit a2 is UMTS, the radio access technology corresponding to the communications unit a3 is LTE, and the radio access technology corresponding to the communications unit a4 is NR. The communications unit b1, the communications unit b2, and the communications unit b3 may respectively correspond to different radio access technologies. For example, the radio access technology corresponding to the communications unit b1 is GSM, the radio access technology corresponding to the communications unit b2 is UMTS, and the radio access technology corresponding to the communications unit b3 is LTE.

Figure 5B:
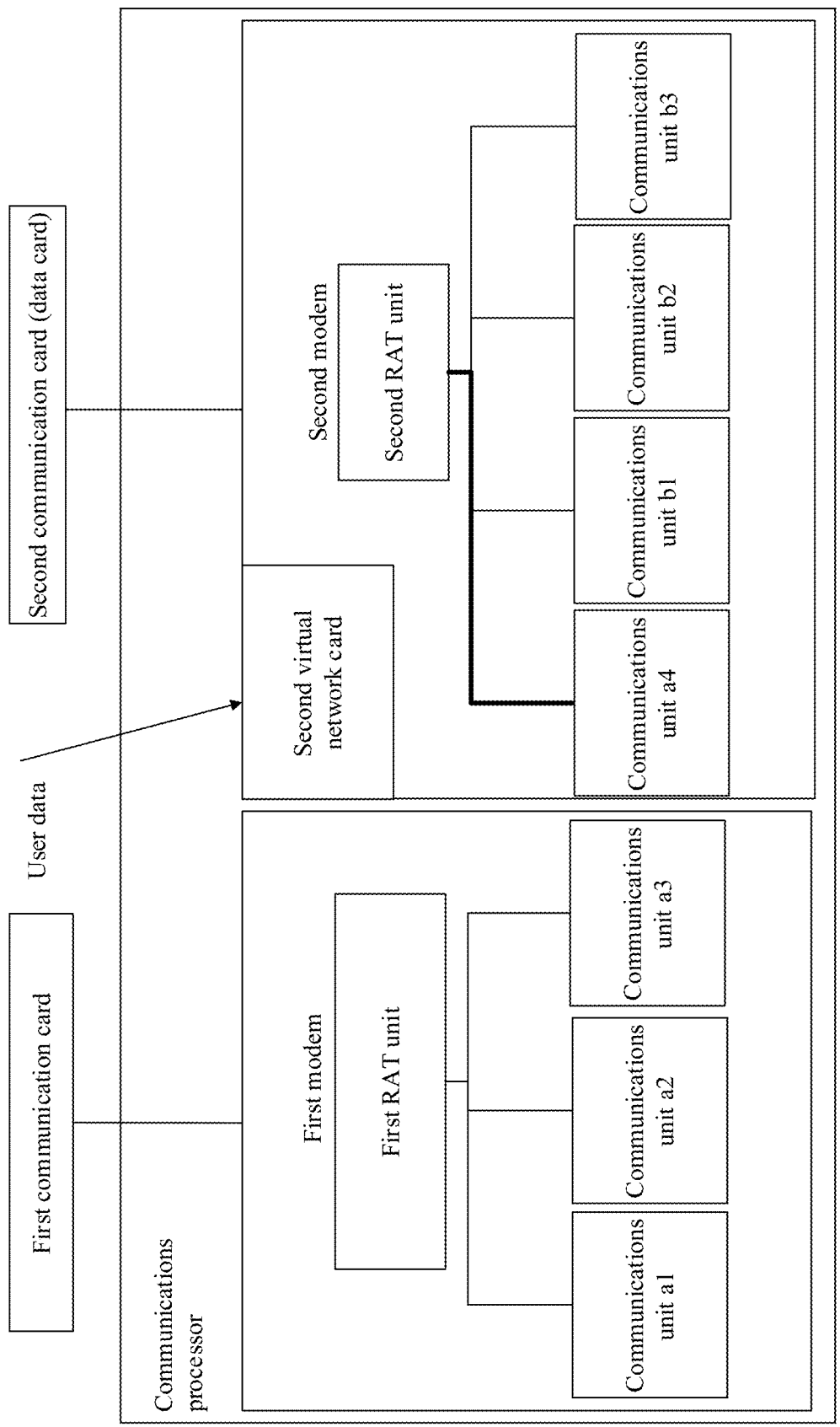
FIG. 5b is a schematic diagram after switching according to an embodiment of this application.

That the wireless communications apparatus deactivates the first wireless communication capability of the first communications module may be specifically as follows: The wireless communications apparatus deletes a mounting relationship between the first RAT main control unit and the communications unit corresponding to the first radio access technology. That the wireless communications apparatus activates the first wireless communication capability of the second communications module may be specifically as follows: The wireless communications apparatus establishes a mounting relationship between the second RAT main control unit and the communications unit corresponding to the first radio access technology. According to FIG. 5a, the radio access technology supported by the first modem includes NR, whereas the radio access technology supported by the second modem does not include NR. Therefore, the first radio access technology may be NR, and the communications unit corresponding to the first radio access technology is the communications unit a4. For details, refer to FIG. 5b.

In another embodiment, the first modem includes a first non-access stratum management unit corresponding to the first radio access technology, a first access stratum management unit mounted to the first non-access stratum management unit, and a first baseband management unit mounted to the first access stratum management unit; the second modem includes a second non-access stratum management unit corresponding to the first radio access technology, and a second access stratum management unit mounted to the second non-access stratum. That the wireless communications apparatus deactivates the first wireless communication capability of the first communications module may be specifically as follows: The wireless communications apparatus deletes a mounting relationship between the first access stratum management unit and the first baseband management unit. That the wireless communications apparatus activates the first wireless communication capability of the second communications module may be specifically as follows: The wireless communications apparatus establishes a mounting relationship between the second access stratum management unit and the first baseband management unit.

Figure 6A:
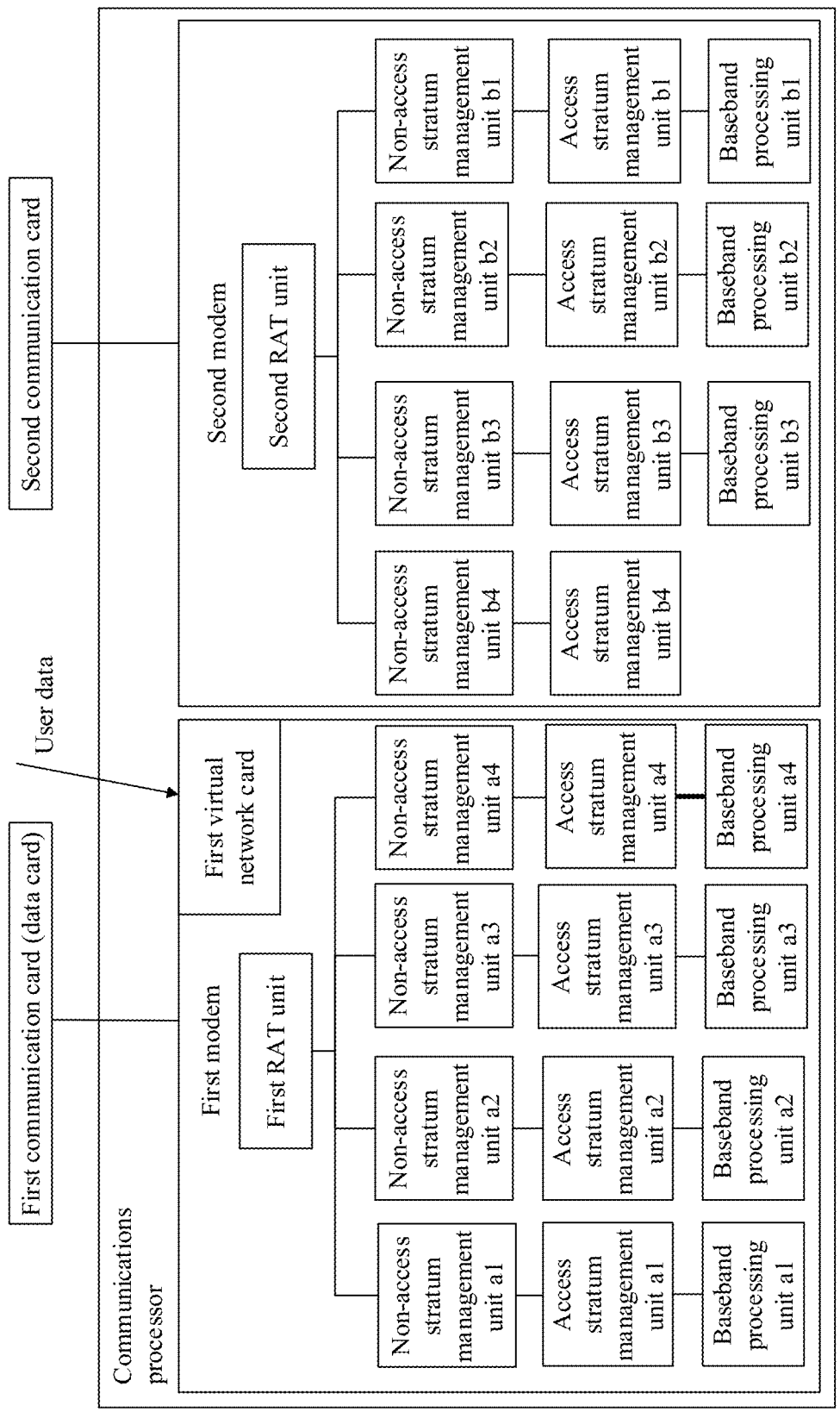
FIG. 6a is another schematic diagram before switching according to an embodiment of this application.
Figure 6B:
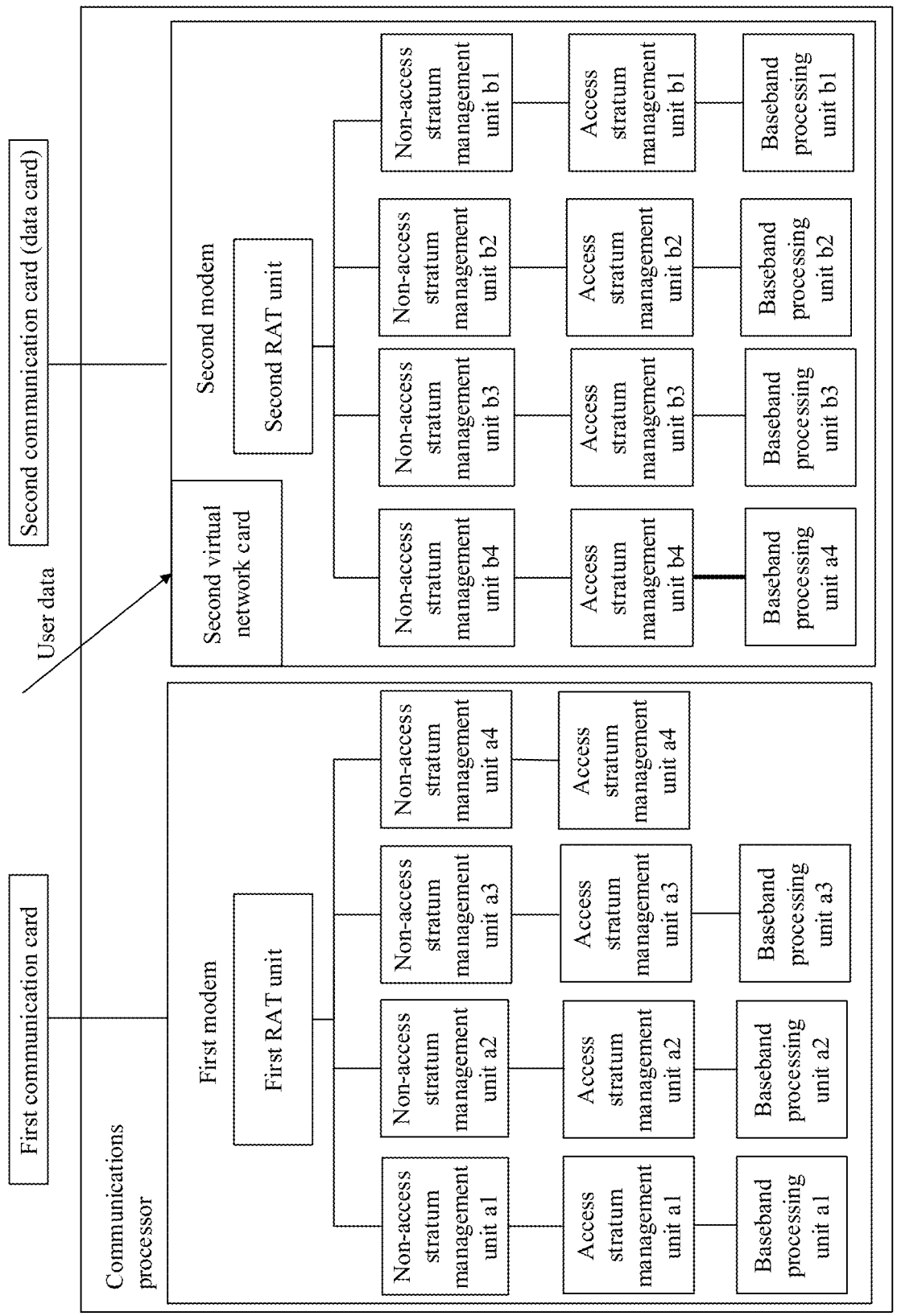
FIG. 6b is another schematic diagram after switching according to an embodiment of this application.

In an embodiment, as shown in FIG. 6a, in the first modem, the non-access stratum management unit a1, the mounted access stratum management unit a1, and the baseband processing unit a1 correspond to the radio access technology a1; the non-access stratum management unit a2, the mounted access stratum management unit a2, and the baseband processing unit a2 correspond to the radio access technology a2; the non-access stratum management unit a3, the mounted access stratum management unit a3, and the baseband processing unit a3 correspond to the radio access technology a3; and the non-access stratum management unit a4, the mounted access stratum management unit a4, and the baseband processing unit a4 correspond to the radio access technology a4. The radio access technology a1, the radio access technology a2, the radio access technology a3, and the radio access technology a4 may be GSM, UMTS, LTE, and NR, respectively. In the first modem, the non-access stratum management unit b1, the mounted access stratum management unit b1, and the baseband processing unit b1 correspond to the radio access technology b1; the non-access stratum management unit b2, the mounted access stratum management unit b2, and the baseband processing unit b2 correspond to the radio access technology b2; the non-access stratum management unit b3, the mounted access stratum management unit b3, and the baseband processing unit b3 correspond to the radio access technology b3; and the non-access stratum management unit b4, the mounted access stratum management unit b4, and the baseband processing unit b4 correspond to the radio access technology b4. The radio access technology b1, the radio access technology b2, the radio access technology b3, and the radio access technology b4 may be GSM, UMTS, LTE, and NR, respectively. It can be learned from the foregoing description that, the first radio access technology may be NR, the first non-access stratum management unit corresponding to the first radio access technology is the non-access stratum management unit a1, the first access stratum management unit is the access stratum management unit a1, the first baseband management unit is the baseband management unit a1, the second non-access stratum management unit is the non-access stratum management unit b1, and the second access stratum management unit is the access stratum management unit b1. For details, refer to FIG. 6b.

In an embodiment of this application, after the first radio access technology of the second modem is activated, the second modem can perform data communication with the data network by using the first radio access technology.

It can be learned from the foregoing description that, in this embodiment of this application, if the user identity corresponding to the default mobile data is switched from the first user identity to the second user identity (or in other words, the data card is switched from the first communication card to the second communication card), the second modem corresponding to the second communication card can communicate with the data network, without a need to switch the correspondence between the communication card and the modem, thereby effectively simplifying the switching process. In addition, the first wireless communication capability of the first modem is deactivated and the first wireless communication capability of the second communications module is activated, so that the second modem can use the first radio access technology to communicate with the data network, effectively ensuring the user's data service experience. In other words, in this embodiment of this application, the first radio access technology can be selectively used by the first modem and the second modem, so that the costs of the terminal product can be effectively reduced.

It should be noted that, in another example, if the radio access technologies supported by the first modem include GSM, UMTS, LTE, and NR, and the radio access technologies supported by the second modem include GSM and UMTS, when switching the communication card, the terminal device can jointly deactivate the LTE radio access technology and the NR radio access technology of the first modem, and jointly activate the LTE radio access technology and the NR radio access technology of the second modem. In other words, the process shown in FIG. 4 is described only by using the first radio access technology as an example, and this embodiment of this application is not limited thereto. Alternatively, two or more radio access technologies of the first modem can be deactivated, and two or more radio access technologies of the second modem can be activated.

The following describes the communication card switching method in this embodiment of this application with reference to specific embodiments (Embodiment 2 and Embodiment 3). Both Embodiment 2 and Embodiment 3 are described by using an example in which the data card is switched from the first communication card to the second communication card. Before switching, the radio access technologies supported by the first modem corresponding to the first communication card include GSM, UMTS, LTE, and NR; and the radio access technologies supported by the first modem corresponding to the second communication card include GSM, UMTS, and LTE.

Embodiment 2

In Embodiment 2, a first modem includes a first radio access technology (radio access technology, RAT) main control unit, and the first RAT main control unit is mounted to a communications unit corresponding to a radio access technology supported by the first modem; the second modem includes a second RAT main control unit, and the second RAT main control unit is mounted to a communications unit corresponding to a radio access technology supported by the second modem. For specific illustration of this embodiment, refer to FIG. 5a and FIG. 5b.

An NR terminal device may include a non-standalone (non-standard alone mode, NSA) mode and a standalone (standard alone mode, SA) mode. In NSA mode, the NR radio access technology cannot work independently, and can only work as a carrier resource of the LTE radio access technology in a DC aggregation manner. In SA mode, the NR radio access technology can work independently, like the LTE radio access technology. The following separately describes the communication card switching process in NSA mode and in SA mode.

Figure 7:
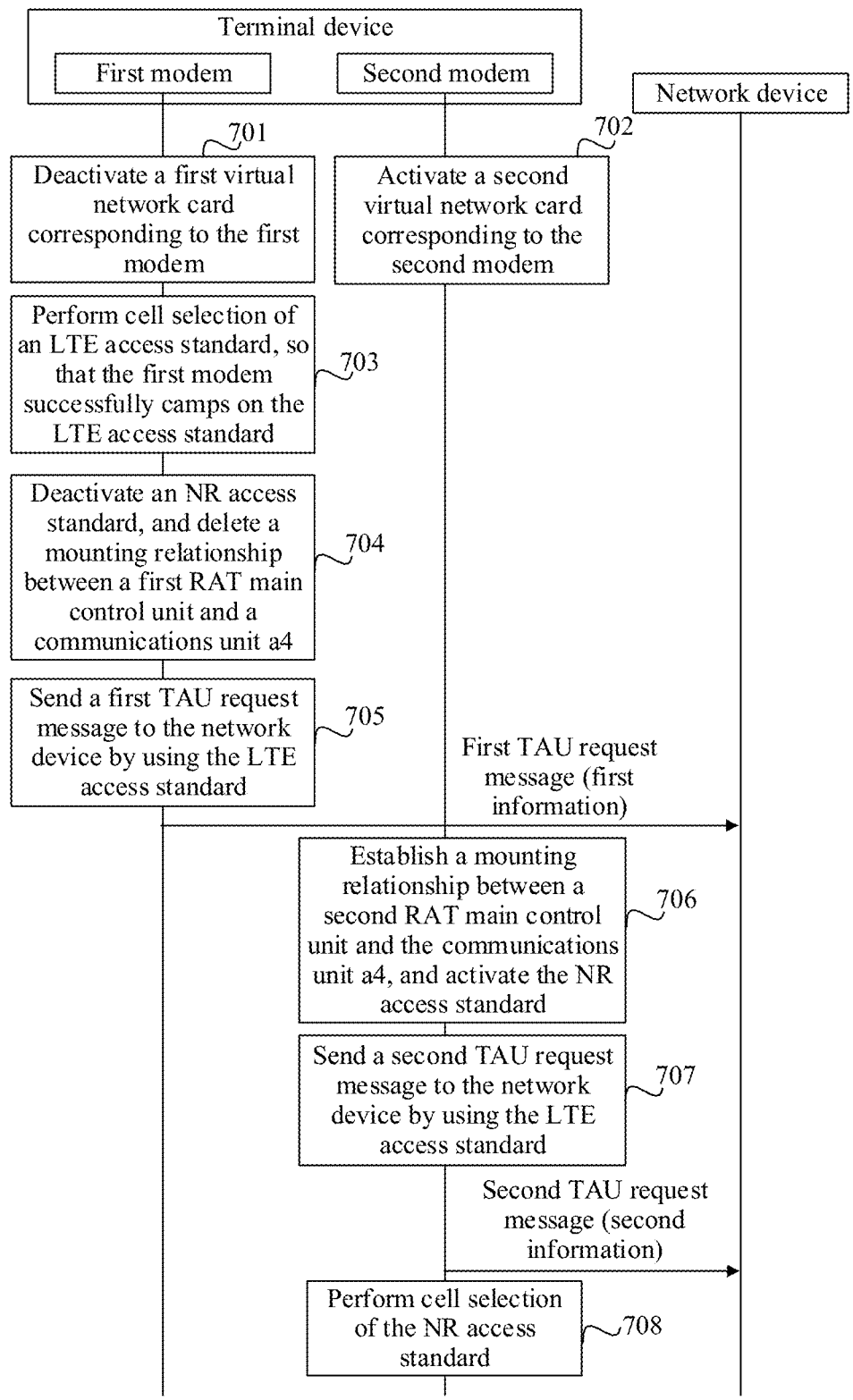
FIG. 7 is a schematic diagram of a switching process according to Embodiment 2 of this application.

FIG. 7 is a schematic diagram of a switching process (SA mode) according to Embodiment 2 of this application. Before switching, the first modem camps on the NR radio access technology and the second modem camps on the LTE radio access technology. As shown in FIG. 7, after the terminal device receives a user's switching instruction, a specific switching process to be executed includes the following operations:

Operation 701: The terminal device deactivates a first virtual network card corresponding to the first modem, so as to stop sending user data to a first modem corresponding to a first communication card.

Operation 702: The terminal device activates a second virtual network card corresponding to the second modem, so as to send user data to a second modem corresponding to a second communication card.

Operation 703: The terminal device executes a cell selection procedure of the LTE radio access technology, so that the first modem successfully camps on a cell of the LTE radio access technology.

Herein, when cell selection is performed, a cell search process can be accelerated based on information about an LTE radio access technology neighboring cell of the NR radio access technology cell configured by the network.

Operation 704: The terminal device deactivates the NR radio access technology of the first modem, and deletes a mounting relationship between a first RAT main control unit and a communications unit a4.

Herein, deactivating the NR radio access technology means that the NR radio access technology no longer works.

Further, before the terminal device deactivates the NR radio access technology of the first modem, if the first modem is in an NR connection mode (that is, a data service scenario), the terminal device triggers the NR mode to locally release the connection and enter an idle state (that is, a standby scenario).

Operation 705: The terminal device sends a first TAU request message to a network device by using the LTE radio access technology, where the first TAU request message includes first information, and the first information is used to indicate that the first modem does not support the NR radio access technology.

In this operation, the terminal device can initiate a TAU process in a protocol standard by using the LTE radio access technology. In the TAU process, the first modem sends the first TAU request message to the network device. The first information included in the first TAU request message may be specifically a DCNR information element.

Operation 706: The terminal device establishes a mounting relationship between a second RAT main control unit and the communications unit a4, and activates the NR radio access technology of the second modem.

Herein, activating the NR radio access technology means that the NR radio access technology can provide a service for a user according to the protocol standard.

Operation 707: The terminal device sends a second TAU request message to the network device by using the LTE radio access technology, where the second TAU request message includes second information, and the second information is used to indicate that the second modem supports the NR radio access technology.

In this operation, the terminal device can initiate a TAU process in the protocol standard by using the LTE radio access technology. In the TAU process, the second modem sends the second TAU request message to the network device. The second information included in the second TAU request message may be specifically a DCNR information element.

Operation 708: After activating the NR radio access technology of the second modem, the terminal device can perform cell selection of the NR radio access technology. If cell search is successful, the terminal device camps on the NR radio access technology. If NR cell search fails, the terminal device continues to camp on the LTE radio access technology, and starts a background search process of the NR radio access technology. After finding a cell of the NR radio access technology through searching, the terminal device camps on the NR radio access technology.

Herein, for a specific implementation process of cell selection, refer to 5.2.3 of the 3GPP protocol 38.304. Details are not described herein. Further, in this embodiment of this application, when cell selection is performed, a cell search process can be accelerated based on information about an NR radio access technology neighboring cell of the LTE radio access technology cell configured by the network.

It should be noted that: (1) If the first modem and the second modem camp on a non-LTE radio access technology, there is no need to perform operations 705, 707, and 708. Other processes are the same as those for camping on the LTE radio access technology. Operations 705, 707, and 708 are performed after the terminal device moves to the LTE radio access technology according to the protocol standard process. (2) The foregoing operation numbers are only an example of executing the process. In this embodiment of this application, a sequence of performing the operations is not specifically limited. For example, in another embodiment, operation 701 and operation 702 may be performed at the same time, or operation 702 may be performed before operation 701.

It can be learned from the foregoing example that, in this embodiment of this application, in the process of changing the user identity corresponding to the default mobile data from the user identity to the second user identity, the voice service is not interrupted, and the network signal display area of the first communication card in the user interface initially displays a 5G network signal (before switching), which is then changed to a 4G network signal (in operation 703, the first modem successfully camps on the cell of the LTE radio access technology); the network signal display area of the second communication card initially displays a 4G network signal, which may be then changed to a 5G network signal (the second modem successfully camps on the cell of the NR radio access technology).

Figure 8:
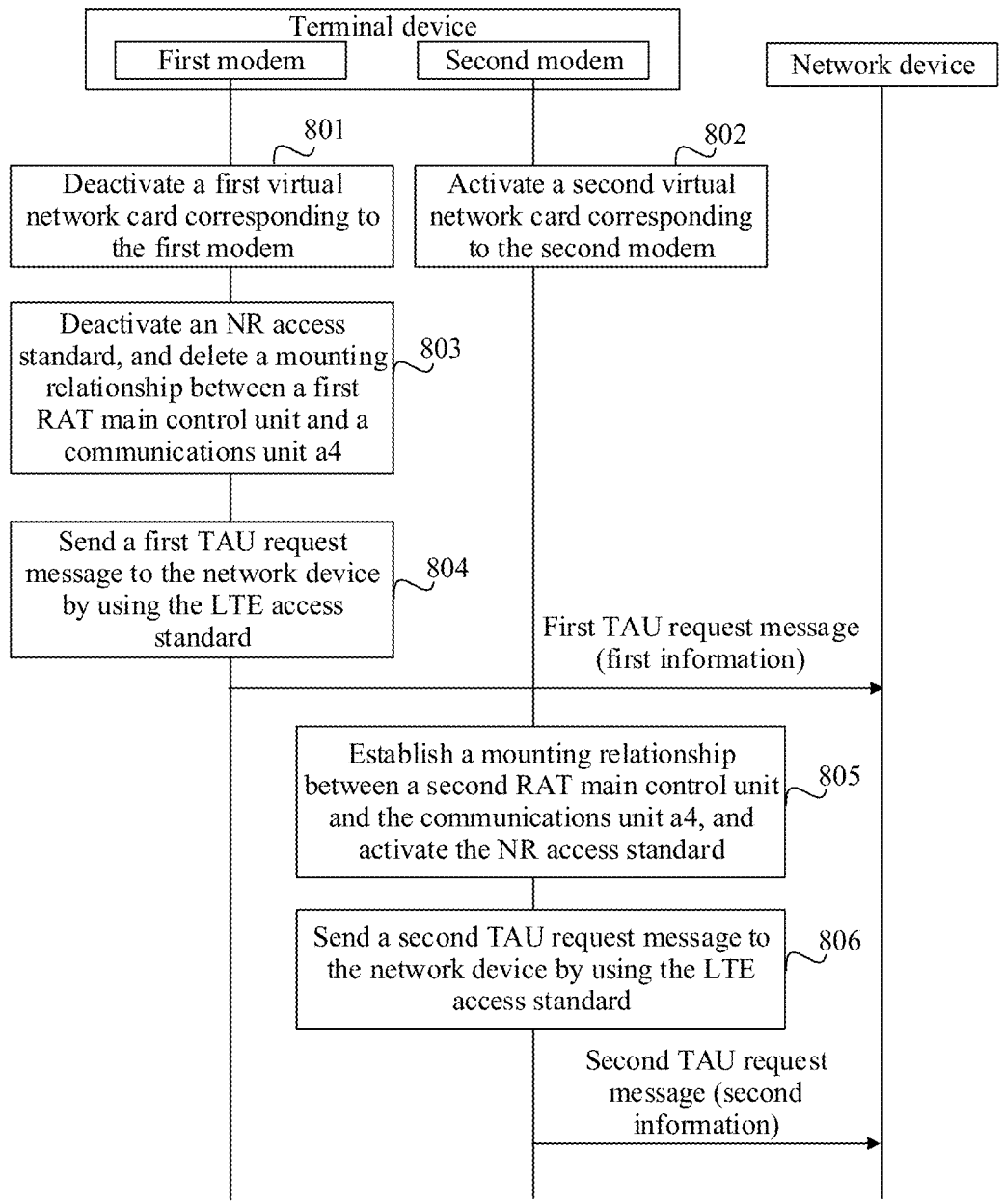
FIG. 8 is a schematic diagram of another switching process according to Embodiment 2 of this application.

FIG. 8 is a schematic diagram of another switching process (NSA mode) according to Embodiment 2 of this application. Before switching, the first modem camps on the LTE radio access technology and the second modem camps on the LTE radio access technology. As shown in FIG. 8, after the terminal device receives a user's switching instruction, a specific switching process to be executed includes the following operations:

Operation 801: The terminal device deactivates a first virtual network card corresponding to the first modem, so as to stop sending user data to a first modem corresponding to a first communication card.

Operation 802: The terminal device activates a second virtual network card corresponding to the second modem, so as to send user data to a second modem corresponding to a second communication card.

Operation 803: The terminal device deactivates the NR radio access technology of the first modem, and deletes a mounting relationship between a first RAT main control unit and a communications unit a4.

Further, before the terminal device deactivates the NR radio access technology of the first modem, if the first modem is in an LTE connection mode (that is, a data service scenario), the terminal device triggers the LTE mode to locally release the connection and enter an idle state (that is, a standby scenario).

Operation 804: The terminal device sends a first TAU request message to a network device by using the LTE radio access technology, where the first TAU request message includes first information, and the first information is used to indicate that the first modem does not support the NR radio access technology.

Operation 805: The terminal device establishes a mounting relationship between a second RAT main control unit and the communications unit a4, and activates the NR radio access technology of the second modem.

Operation 806: The terminal device sends a second TAU request message to the network device by using the LTE radio access technology, where the second TAU request message includes second information, and the second information is used to indicate that the second modem supports the NR radio access technology.

It should be noted that: (1) If the first modem and the second modem camp on a non-LTE radio access technology, there is no need to perform operations 804 and 806. Other processes are the same as those for camping on the LTE radio access technology. Operations 804 and 806 are performed after the terminal device moves to the LTE radio access technology according to the protocol standard process. (2) The foregoing operation numbers are only an example of executing the process. In this embodiment of this application, a sequence of performing the operations is not specifically limited.

The difference between the processes shown in FIG. 7 and FIG. 8 is generated due to the difference between the NSA mode and the SA mode of the terminal device, and other content can be referred to each other.

In Embodiment 2 of this application, because the first modem and the second modem can selectively use the communications unit corresponding to the first radio access technology, when the communication card is switched (the data card is switched from the first communication card to the second communication card), there is no need to switch the correspondence between the communication card and the modem, and the communications unit corresponding to the first radio access technology is switched to be used by the second modem corresponding to the second communication card. This can effectively simplify the switching process, reduce duration of the switching, and provide a user with better data service experience.

Embodiment 3

In Embodiment 3, a first modem includes a first main control module, and a non-access stratum management unit, an access stratum management unit, and a baseband management unit corresponding to various radio access technologies (GSM, UMTS, LTE, and NR) supported by the first modem; a second modem includes a second main control module, and a non-access stratum management unit, an access stratum management unit, and a baseband management unit corresponding to various radio access technologies (GSM, UMTS, and LTE) supported by the second modem. Further, the second modem further includes a non-access stratum management unit and an access stratum management unit corresponding to the NR radio access technology, but does not include a baseband management unit corresponding to the NR radio access technology. For specific illustration of this embodiment, refer to FIG. 6a and FIG. 6b.

In an embodiment, the first RAT main control unit is configured to manage all the radio access technologies supported by the first modem, and can support addition and deletion of each radio access technology; the second RAT main control unit is configured to manage all the radio access technologies supported by the second modem, and can support addition and deletion of each radio access technology. The non-access stratum management unit is a mobility management unit, which is responsible for mobility management and connection management of the non-access stratum, and supports registration with processes such as location area update, to implement communication with a core network. The access stratum management unit is an access stratum RRC processing unit in the protocol standard, and is responsible for mobility management and RRC connection management that are related to the access stratum. The baseband processing unit is a physical layer processing unit in the protocol standard, and supports processing of coding and decoding, and modulation and demodulation of a channel.

Figure 9:
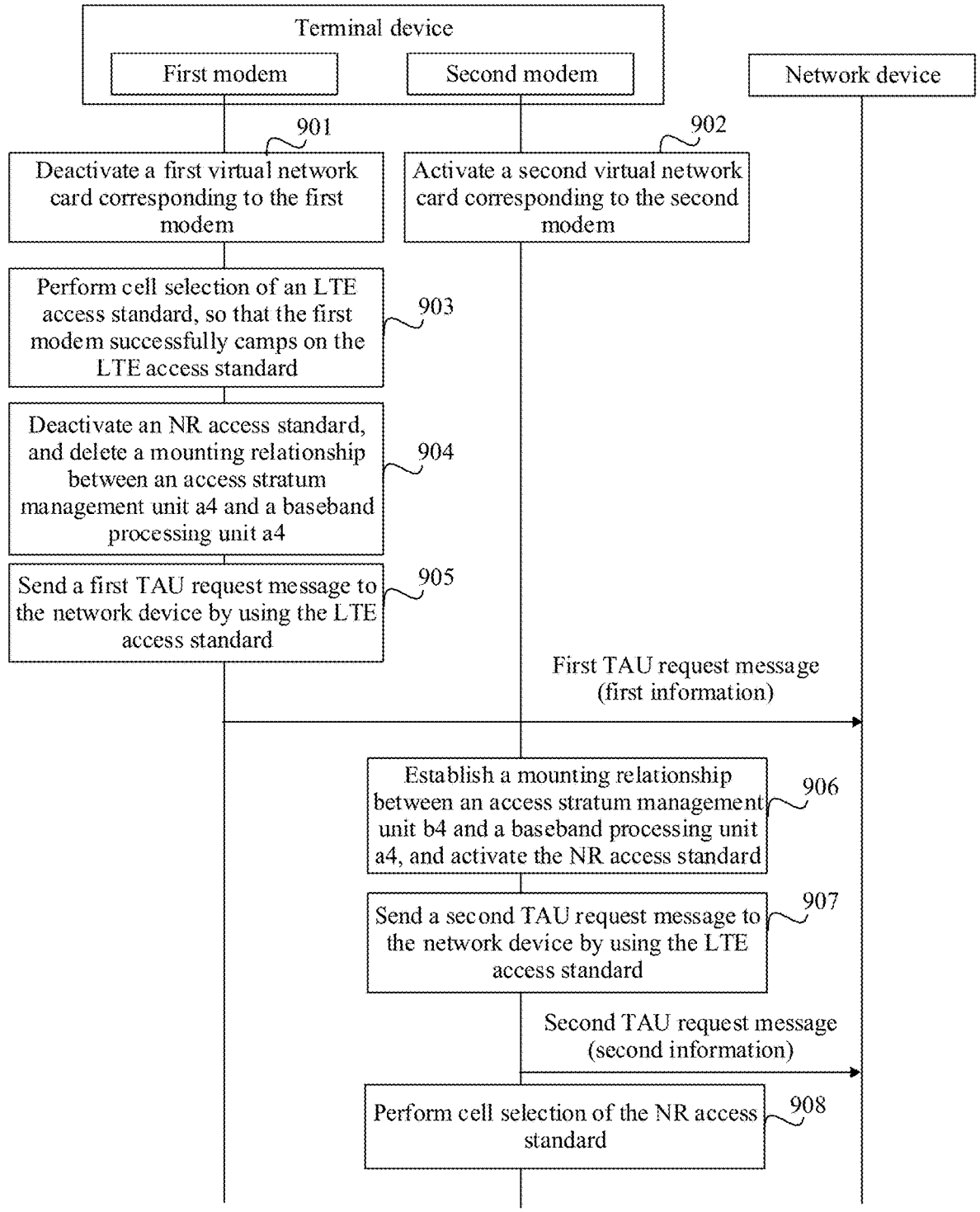
FIG. 9 is a schematic diagram of a switching process according to Embodiment 3 of this application.

FIG. 9 is a schematic diagram of a switching process (SA mode) according to Embodiment 3 of this application. Before switching, the first modem camps on the NR radio access technology and the second modem camps on the LTE radio access technology. As shown in FIG. 9, after the terminal device receives a user's switching instruction, a specific switching process to be executed includes the following operations:

Operation 901: The terminal device deactivates a first virtual network card corresponding to the first modem, so as to stop sending user data to a first modem corresponding to a first communication card.

Operation 902: The terminal device activates a second virtual network card corresponding to the second modem, so as to send user data to a second modem corresponding to a second communication card.

Operation 903: The terminal device performs cell selection of the LTE radio access technology, so that the first modem successfully camps on the LTE radio access technology.

Operation 904: The terminal device deactivates the NR radio access technology of the first modem, and deletes a mounting relationship between an access stratum management unit a4 and a baseband management unit a4.

Operation 905: The terminal device sends a first TAU request message to a network device by using the LTE radio access technology, where the first TAU request message includes first information, and the first information is used to indicate that the first modem does not support the NR radio access technology.

Operation 906: The terminal device establishes a mounting relationship between an access stratum management unit b4 and a baseband management unit a4, and activates the NR radio access technology of the second modem.

Operation 907: The terminal device sends a second TAU request message to the network device by using the LTE radio access technology, where the second TAU request message includes second information, and the second information is used to indicate that the second modem supports the NR radio access technology.

Operation 908: After activating the NR radio access technology of the second modem, the terminal device can perform cell selection of the NR radio access technology. If cell search is successful, the terminal device camps on the NR radio access technology. If NR cell search fails, the terminal device continues to camp on the LTE radio access technology, and starts a background search process of the NR radio access technology. After finding a cell of the NR radio access technology through searching, the terminal device camps on the NR radio access technology.

It should be noted that: (1) If the first modem and the second modem camp on a non-LTE radio access technology, there is no need to perform operations 905, 907, and 908. Other processes are the same as those for camping on the LTE radio access technology. Operations 905, 907, and 908 are performed after the terminal device moves to the LTE radio access technology according to the protocol standard process. (2) The foregoing operation numbers are only an example of executing the process. In an embodiment of this application, a sequence of performing the operations is not specifically limited.

Figure 10:
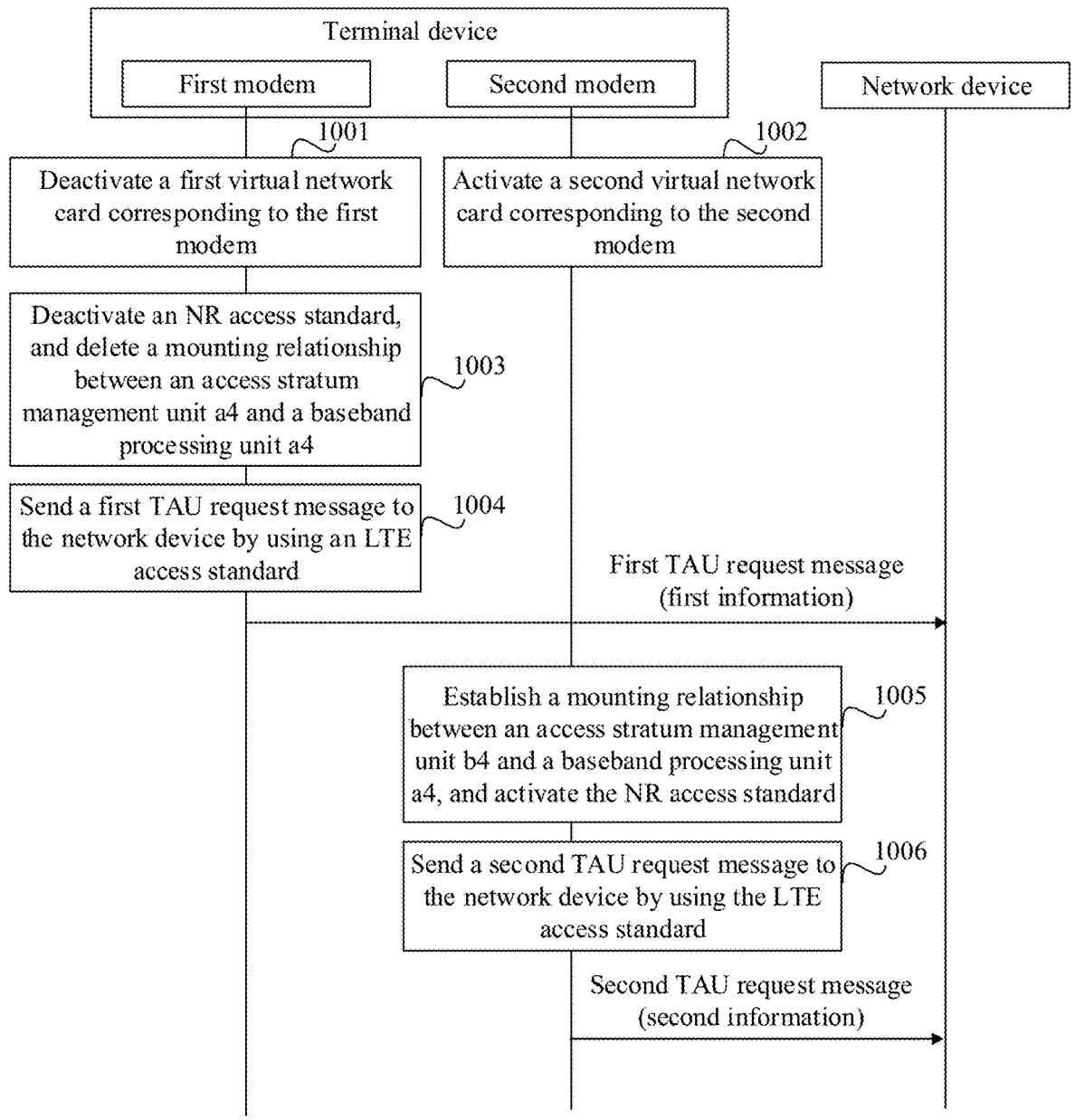
FIG. 10 is a schematic diagram of another switching process according to Embodiment 3 of this application.

FIG. 10 is a schematic diagram of another switching process (NSA mode) according to Embodiment 3 of this application. Before switching, the first modem camps on the LTE radio access technology and the second modem camps on the LTE radio access technology. As shown in FIG. 10, after the terminal device receives a user's switching instruction, a specific switching process to be executed includes the following operations:

Operation 1001: The terminal device deactivates a first virtual network card corresponding to the first modem, so as to stop sending user data to a first modem corresponding to a first communication card.

Operation 1002: The terminal device activates a second virtual network card corresponding to the second modem, so as to send user data to a second modem corresponding to a second communication card.

Operation 1003: The terminal device deactivates the NR radio access technology of the first modem, and deletes a mounting relationship between an access stratum management unit a4 and a baseband processing unit a4.

Further, before the terminal device deactivates the NR radio access technology of the first modem, if the first modem is in an LTE connection mode (that is, a data service scenario), the terminal device triggers the LTE mode to locally release the connection and enter an idle state (that is, a standby scenario).

Operation 1004: The terminal device sends a first TAU request message to a network device by using the LTE radio access technology, where the first TAU request message includes first information, and the first information is used to indicate that the first modem does not support the NR radio access technology.

Operation 1005: The terminal device establishes a mounting relationship between an access stratum management unit b4 and a baseband processing unit a4, and activates the NR radio access technology of the second modem.

Operation 1006: The terminal device sends a second TAU request message to the network device by using the LTE radio access technology, where the second TAU request message includes second information, and the second information is used to indicate that the second modem supports the NR radio access technology.

It should be noted that: (1) If the first modem and the second modem camp on a non-LTE radio access technology, there is no need to perform operations 1004 and 1006. Other processes are the same as those for camping on the LTE radio access technology. Operations 1004 and 1006 are performed after the terminal device moves to the LTE radio access technology according to the protocol standard process. (2) The foregoing operation numbers are only an example of executing the process. In this embodiment of this application, a sequence of performing the operations is not specifically limited.

The difference between the processes shown in FIG. 9 and FIG. 10 is generated due to the difference between the NSA mode and the SA mode of the terminal device, and other content can be referred to each other.

In Embodiment 2 of this application, because the first modem and the second modem can selectively use the baseband processing unit corresponding to the first radio access technology, when the communication card is switched (the data card is switched from the first communication card to the second communication card), there is no need to switch the correspondence between the communication card and the modem, and the baseband processing unit corresponding to the first radio access technology is switched to be used by the second modem corresponding to the second communication card. This can effectively simplify the switching process, reduce duration of the switching, provide a user with better data service experience, and effectively reduce hardware costs of the terminal device.

Regarding the foregoing Embodiment 2 and Embodiment 3, in Embodiment 2, when the communication card is switched, a mounting relationship between the communications units (including the non-access stratum management unit, the access stratum management unit, and the baseband processing unit) corresponding to the first radio access technology is changed. In Embodiment 3, when the communication card is switched, the mounting relationship of the baseband processing unit corresponding to the first radio access technology is changed. Functions of the non-access stratum management unit and the access stratum management unit can be usually implemented in the form of software, whereas functions of the baseband processing unit need to be implemented by hardware. Therefore, in this embodiment of this application, changing the mounting relationship of the communications unit or the baseband processing unit corresponding to the first radio access technology can save hardware design of the baseband processing unit, and reduce costs of the terminal device. In another possible embodiment, the mounting relationship between the access stratum management unit and the baseband processing unit corresponding to the first radio access technology may also be changed, or another design based on the foregoing ideas is used. This is not specifically limited in this application.

Figure 11:
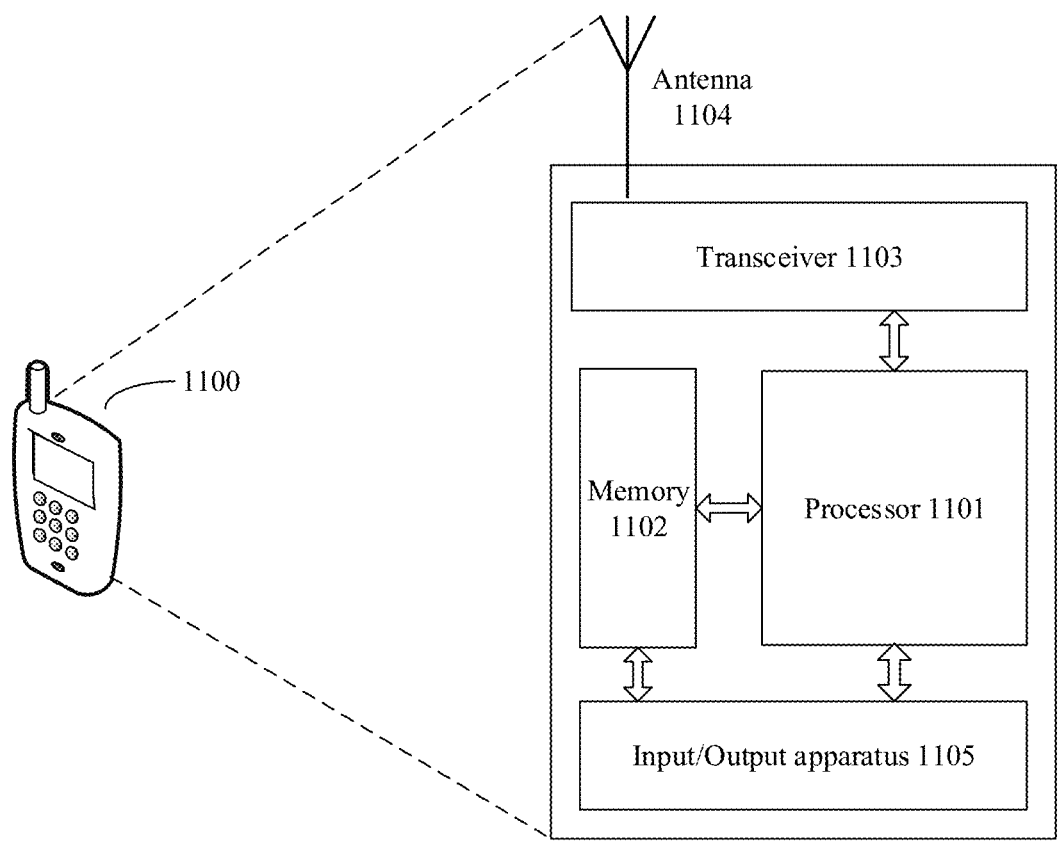
FIG. 11 is a schematic structural diagram of another terminal device according to an embodiment of this application.

FIG. 11 is a schematic structural diagram of another wireless communications apparatus according to an embodiment of this application. The wireless communications apparatus shown in FIG. 11 may be an implementation of a hardware circuit of the wireless communications apparatus shown in FIG. 3b. The wireless communications apparatus may be applicable to the flowchart shown in FIG. 2, FIG. 3a, or FIG. 3b, to perform the functions of the wireless communications apparatus in the foregoing method embodiment. For ease of description, FIG. 11 shows only main components of the wireless communications apparatus. As shown in FIG. 11, a wireless communications apparatus 1100 includes a processor 1101, a memory 1102, a transceiver 1103, an antenna 1104, and an input/output apparatus 1105. The processor 1101 is mainly configured to: process a communications protocol and communication data, control the entire wireless communications apparatus, execute a software program, and process data of the software program. For example, the processor 1101 is configured to support the wireless communications apparatus in performing the actions described in the foregoing method embodiment, for example, send a first request message to a first cell. The memory 1102 is mainly configured to store a software program and data. The transceiver 1103 is mainly configured to perform conversion between a baseband signal and a radio frequency signal, and process a radio frequency signal. The antenna 1104 is mainly configured to receive and send a radio frequency signal in an electromagnetic wave form. The input/output apparatus 1105, such as a touchscreen, a display screen, or a keyboard, is mainly configured to: receive data entered by a user and output data to the user.

After the wireless communications apparatus 1100 is powered on, the processor 1101 can read the software program in the memory 1102 and execute the following process:

When the transceiver 1103 uses a first wireless communication capability to communicate with a second wireless communications apparatus, if it is determined to adjust a wireless communication capability of a first wireless communications apparatus, the transceiver 1103 sends first adjustment information to the second wireless communications apparatus and starts a first timer, where the first adjustment information is used to indicate that the wireless communication capability of the first wireless communications apparatus is adjusted to a second wireless communication capability. The transceiver 1103 is configured to:

within a specified time of the first timer, use the second wireless communication capability to communicate with the second wireless communications apparatus, where the first wireless communication capability is any one of the multiple wireless communication capabilities, and the second wireless communication capability is any one of the multiple wireless communication capabilities except a maximum wireless communication capability and a minimum wireless communication capability.

A person skilled in the art may understand that for ease of description, FIG. 11 shows only one memory and only one processor. Actually, the wireless communications apparatus may have multiple processors and multiple memories. The memory may also be referred to as a storage medium, a storage device, or the like. This is not limited in this embodiment of this application.

An embodiment of this application further provides a wireless communications apparatus, where the wireless communications apparatus can perform wireless communication by using a first user identity and a second user identity; a first communications module corresponding to the first user identity supports a first wireless communication capability and a second wireless communication capability; a second communications module corresponding to the second user identity supports the second wireless communication capability; and the wireless communications apparatus includes the following: an interface circuit, and one or more processors coupled to the interface circuit, where the wireless communications apparatus is configured to execute the method procedure shown in FIG. 4.

The interface circuit is configured to exchange information between the processor 1101 and an external device, and may be specifically a logic circuit that connects the transceiver 1103 and the processor 1101 shown in FIG. 11. The one or more processors may include the application program processor and the communications processor shown in FIG. 2, and may be specifically the processor 1101 shown in FIG. 11.

It should be understood that, the processor in the embodiments of this application may be a central processing unit (CPU), or may further be another general purpose processor, a digital signal processor (DSP), an application-specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

All or some of the foregoing embodiments may be implemented by means of software, hardware (for example, circuit), firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

The embodiments of the present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Obviously, a person skilled in the art can make various modifications and variations to embodiments of the present invention without departing from the spirit and scope of this application. This application is intended to cover these modifications and variations provided that they fall within the scope of protection defined by the following claims and their equivalent technologies.

What is claimed is:

1. A wireless communications apparatus, comprising:
   an interface circuit; and
   one or more processors coupled to the interface circuit and configured to:
   deactivate a first wireless communication capability of a first communications module corresponding to a first user identity, so that the first communications module does not support the first wireless communication capability, wherein the first communications module is capable of supporting the first wireless communication capability and a second wireless communication capability;
   activate a first wireless communication capability of a second communications module corresponding to a second user identity, so that the second communications module supports the first wireless communication capability;

send a first uplink message through the interface circuit to indicate that the first user identity does not support the first wireless communication capability; and send a second uplink message through the interface circuit to indicate that the second user identity supports the first wireless communication capability, wherein the wireless communications apparatus is capable of performing wireless communication using the first user identity and the second user identity; and determine, based on an instruction input received via a user interface, that a user identity corresponding to default mobile data needs to be changed from the first user identity to the second user identity.

2. The wireless communications apparatus according to claim 1, wherein
the first wireless communication capability is associated with a first radio access technology, the second wireless communication capability is associated with a second radio access technology, and a communication capability of the first radio access technology is superior to a communication capability of the second radio access technology.

3. The wireless communications apparatus according to claim 2, wherein
the first radio access technology is a 5G radio access technology, the second radio access technology is a 4G radio access technology, and at least one of the first uplink message and the second uplink message is a tracking area update (TAU) request message.

4. The wireless communications apparatus according to claim 2, wherein
the first radio access technology is a 4G radio access technology, the second radio access technology is a 3G or 2G radio access technology, and at least one of the first uplink message and the second uplink message is a location area update (LAU) request message.

5. The wireless communications apparatus according to claim 1, wherein the one or more processors are further configured to:
before sending the first uplink message, enable the wireless communications apparatus to perform a cell selection procedure or a cell reselection procedure using the first user identity, so that the wireless communications apparatus is to select a cell of a second radio access technology from a cell of a first radio access technology using the first user identity.

6. The wireless communications apparatus according to claim 1, wherein the one or more processors are further configured to:
after sending the second uplink message, enable the wireless communications apparatus to perform a cell selection procedure, a cell reselection procedure, or a background scanning procedure using the second user identity, so that the wireless communications apparatus is to select a cell of a first radio access technology from a cell of a second radio access technology using the second user identity.

7. The wireless communications apparatus according to claim 1, wherein
the first wireless communication capability and the second wireless communication capability are associated with a same radio access technology, and the first wireless communication capability is superior to the second wireless communication capability.

8. The wireless communications apparatus according to claim 7, wherein
the radio access technology is a 4G or 5G radio access technology, and a quantity of multiple carriers used by the first wireless communication capability is larger than a quantity of multiple carriers used by the second wireless communication capability.

9. The wireless communications apparatus according to claim 1, wherein the one or more processors are further configured to:
determine, based on usage of data traffic, that a user identity corresponding to default mobile data is changed from the first user identity to the second user identity.

10. A wireless communication method performed by a wireless communications apparatus, the method comprising:
deactivating a first wireless communication capability of a first communications module corresponding to a first user identity, so that the first communications module does not support the first wireless communication capability, wherein the first communications module is capable of supporting the first wireless communication capability and a second wireless communication capability;

activating a first wireless communication capability of a second communications module corresponding to a second user identity, so that the second communications module supports the first wireless communication capability;

sending a first uplink message to indicate that the first user identity does not support the first wireless communication capability; and sending a second uplink message to indicate that the second user identity supports the first wireless communication capability, wherein the wireless communications apparatus is capable of performing wireless communication using the first user identity and the second user identity; and before the first wireless communication capability of the first communications module is deactivated, determining, based on usage of data traffic, that a user identity corresponding to default mobile data needs to be changed from the first user identity to the second user identity.

11. The wireless communication method according to claim 10, further comprising:
before the first uplink message is sent, performing a cell selection procedure or a cell reselection procedure using the first user identity, so that the wireless communications apparatus is to select a cell of a second radio access technology from a cell of a first radio access technology by using the first user identity.

12. The wireless communication method according to claim 10, further comprising:
after the second uplink message is sent, performing a cell selection procedure, a cell reselection procedure, or a background scanning procedure using the second user identity, so that the wireless communications apparatus is to select a cell of a first radio access technology from a cell of a second radio access technology by using the second user identity.

13. The wireless communication method according to claim 10, further comprising:
before the first wireless communication capability of the first communications module is deactivated, determining, based on an instruction input received via a user interface, that a user identity corresponding to default mobile data needs to be changed from the first user identity to the second user identity.

14. The wireless communication method according to claim 10, wherein
the first wireless communication capability is associated with a first radio access technology, the second wireless communication capability is associated with a second radio access technology, and a communication capability of the first radio access technology is superior to a communication capability of the second radio access technology.

15. The wireless communication method according to claim 14, wherein
the first radio access technology is a 5G radio access technology, the second radio access technology is a 4G radio access technology, and at least one of the first uplink message and the second uplink message is a tracking area update (TAU) request message.

16. The wireless communication method according to claim 14, wherein
the first radio access technology is a 4G radio access technology, the second radio access technology is a 3G or 2G radio access technology, and at least one of the first uplink message and the second uplink message is a location area update (LAU) request message.

17. The wireless communication method according to claim 10, wherein
the first wireless communication capability and the second wireless communication capability are associated with a same radio access technology, and the first wireless communication capability is superior to the second wireless communication capability.

18. A wireless communications apparatus, comprising:
at least one processor; and
at least one memory coupled to the at least one processor to store instructions, which when executed by the at least one processor, cause the at least one processor to
deactivate a first wireless communication capability of a first communications module corresponding to a first user identity, so that the first communications module does not support the first wireless communication capability, wherein the first communications module is capable of supporting the first wireless communication capability and a second wireless communication capability;
activate a first wireless communication capability of a second communications module corresponding to a second user identity, so that the second communications module supports the first wireless communication capability;
send a first uplink message through an interface circuit to indicate that the first user identity does not support the first wireless communication capability; and
send a second uplink message through the interface circuit to indicate that the second user identity supports the first wireless communication capability, wherein the wireless communications apparatus is capable of performing wireless communication using the first user identity and the second user identity; and
before the first wireless communication capability of the first communications module is deactivated, determine, based on usage of data traffic, that a user identity corresponding to default mobile data needs to be changed from the first user identity to the second user identity.

* * * * *